(12) United States Patent
Wu et al.

(10) Patent No.: US 11,362,790 B2
(45) Date of Patent: Jun. 14, 2022

(54) METHOD AND DEVICE USED IN UE AND BASE STATION FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 52 days.

(21) Appl. No.: 17/089,684

(22) Filed: Nov. 4, 2020

(65) Prior Publication Data

US 2021/0050965 A1   Feb. 18, 2021

Related U.S. Application Data

(63) Continuation of application No. PCT/CN2020/074312, filed on Feb. 5, 2020.

(30) Foreign Application Priority Data

Feb. 15, 2019 (CN) .......................... 201910116748.0

(51) Int. Cl.
*H04L 5/00* (2006.01)
*H04L 1/00* (2006.01)
*H04W 72/04* (2009.01)

(52) U.S. Cl.
CPC ............ *H04L 5/005* (2013.01); *H04L 1/0003* (2013.01); *H04W 72/042* (2013.01); *H04W 72/0446* (2013.01); *H04W 72/0453* (2013.01)

(58) Field of Classification Search
CPC .... H04L 5/005; H04L 1/0003; H04W 72/042; H04W 72/0446; H04W 74/0453
See application file for complete search history.

(56) References Cited

U.S. PATENT DOCUMENTS

2012/0155414 A1   6/2012 Noh et al.
2020/0196332 A1*  6/2020 Yokomakura ......... H04W 76/27

FOREIGN PATENT DOCUMENTS

CN    102088429 A    6/2011
CN    108111272 A    6/2018
(Continued)

OTHER PUBLICATIONS

ZTE "Enhancements on multi-TRP transmission and reception" 3GPP TSG RAN WG1 Meeting #94 R1-1808202 Aug. 24, 2018.
(Continued)

*Primary Examiner* — Ronald B Abelson

(57) ABSTRACT

The present disclosure provides a method and device used in UE and a base station for wireless communications. The UE receives a first signaling; and operates a first radio signal. The first radio signal comprises K first-type sub-signals and K first-type reference signals; the first signaling is used for determining time-frequency resources occupied by the first radio signal; time-domain resources occupied by the K first-type sub-signals are non-orthogonal, and frequency-domain resources occupied by each two of the K first-type reference signals are mutually orthogonal; the K first-type reference signals are respectively used for channel estimation of the K first-type sub-signals, and a reference signal port of each of the K first-type reference signals is associated with a target reference signal port. The above method is advantageous in improving efficiency of PTRSs in multi-TRP/panel transmissions.

20 Claims, 29 Drawing Sheets

(56) References Cited

FOREIGN PATENT DOCUMENTS

| CN | 108400855 | A | 8/2018 |
|---|---|---|---|
| CN | 108632179 | A | 10/2018 |
| CN | 108633083 | A | 10/2018 |
| CN | 108809576 | A | 11/2018 |
| CN | 108900286 | A | 11/2018 |
| CN | 108989010 | A | 12/2018 |
| WO | 2018145668 | A1 | 8/2018 |
| WO | 2018225927 | A1 | 12/2018 |

OTHER PUBLICATIONS

ZTE Discussion on downlink DMRS design 3GPP TSG RAN WG1 Meeting #89 R1-1707130 May 19, 2017.

CN201910116748.0 1st Office Action dated Mar. 18, 2021.

CN201910116748.0 First Search Report dated Mar. 10, 2021.

ISR in application PCT/CN2020/074312 dated Apr. 23, 2020.

National Instruments. "Discussion on Signaling for PT-RS" 3GPP TSGRAN WG1Meeting#88bis. R1-1705253.Apr. 7, 2017(Apr. 7, 2017).

ZTE. "Enhancements on multi-TRP/Panel transmission" 3GPPTSGRAN WGIMeeting#95, R1-1812256,Nov. 16, 2018(Nov. 16, 2018).

Samsung."On DL PT-RS Design" 3GPP TSGRAN WGI#89,R1-1707976,May 19, 2017(May 19, 2017).

Panasonic. "PT-RS port association and indication" 3GPPTSGRAN WGIMeeting#&bis,R1-1705160,Apr. 7, 2017 (Apr. 7, 2017).

\* cited by examiner

First signaling —being used for determining→ time-frequency resources occupied by first radio signal

FIG. 9

First reference signal ↔ {first number of PT-RS groups, first number of samples per PT-RS group}

Second reference signal ↔ {second number of PT-RS groups, second number of samples per PT-RS group}

FIG. 17

| First information | First sub-information | ... |
|---|---|---|

FIG. 18

| First information | Second sub-information | ... |

FIG. 19

| First information | First sub-information | Second sub-information | ... |
|---|---|---|---|

FIG. 20

Reference bandwidth threshold set —being used for determining→ frequency-domain density of reference first-type reference signal

FIG. 22

| Second information set | K1 piece(s) of second information | ... |
|---|---|---|

FIG. 24

Second information in L1 piece(s) of second information

Second information in L2 piece(s) of second information

Second information#0

...

Second information#K1-1

| Fourth information set | K2 piece(s) of fourth information | ... |
|---|---|---|

FIG. 27

METHOD AND DEVICE USED IN UE AND BASE STATION FOR WIRELESS COMMUNICATION

CROSS REFERENCE TO RELATED APPLICATIONS

This application is a continuation of International Application No. PCT/CN2020/074312, filed Feb. 5, 2020, claims the priority benefit of Chinese Patent Application No. 201910116748.0, filed on Feb. 15, 2019, the full disclosure of which is incorporated herein by reference.

BACKGROUND

Technical Field

The present disclosure relates to transmission methods and devices in wireless communication systems, and in particular to a transmission method and device of radio signals in a wireless communication system supporting cellular network.

Related Art

In $3^{rd}$ Generation Partner Project (3GPP) Long-term Evolution (LTE), reference signal remains an essential means of ensuring communication quality. In a high-frequency band, the phase noise will cause a non-negligible impact on the performance of channel estimation. In NR R15, a Phase-Tracking Reference Signal (PTRS) is used for phase-tracking, employing phase compensation in channel estimation to improve the precision of channel estimation. Each PTRS port is associated with a DeModulation Reference Signals (DMRS) port, and a pattern of a PTRS port is related to its associated DMRS port.

Massive Multi-Input Multi-Output (MIMO) is a key technology in 5G mobile communications. For the massive MIMO, multiple antennas based on beamforming form a narrow beam which points to a particular direction to improve the quality of communication. When multiple antennas belong to multiple Transmitter Receiver Points (TRP)/panels, extra diversity gains can be acquired by employing spatial differences between different TRPs/panels. Multiple TRPs/panels can serve one User Equipment (UE) simultaneously to improve robustness of communications and/or transmission rate of a single UE.

SUMMARY

Inventors found through researches that in multi-TRP/panel transmissions, different TRPs/panels can be multiplexed in the method of Frequency division multiplexing (FDM). In FDM multiplexing mode, different TRPs/panels may employ a same DMRS port but have different requirements for patterns of PTRSs, which puts forward new requirements for the design of PTRS.

In view of the above problem, the present disclosure provides a solution. It should be noted that the embodiments of a User Equipment in the present disclosure and the characteristics in the embodiments may be applied to a base station if no conflict is incurred, and vice versa. The embodiments of the present disclosure and the characteristics of the embodiments may be mutually combined if no conflict is incurred.

The present disclosure provides a method in a UE for wireless communications, comprising:
    receiving a first signaling; and
    operating a first radio signal, the first radio signal comprising K first-type sub-signals and K first-type reference signals, K being a positive integer greater than 1;
    herein, the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; the operating action is transmitting, or the operating action is receiving.

In one embodiment, a problem needed to be solved in the present disclosure is: in multi-TRP/panel transmissions, how to design PTRSs when PTRSs of different TRPs/panels are associated with a same DMRS port, while different TRPs/panels have different requirements for patterns of PTRSs. The above method solves this problem by allowing PTRSs associated with a same DMRS port to have different patterns in different time-frequency resources.

In one embodiment, the above method is essential in that: the K first-type reference signals are respectively PTRSs of the K first-type sub-signals; the K first-type reference signals are associated with a same DMRS port, that is, the target reference signal port, but still can have different patterns.

In one embodiment, the above method is advantageous in that: in multi-TRP/panel transmissions, different TRPs/panels are allowed to use a same DMRS port, which reduces a signaling overhead; meanwhile, different TRPs/panels are allowed to determine their own PTRS patterns according to their own requirements, thus improving reliability of channel estimation, transmission efficiency as well as transmission reliability.

According to one aspect of the present disclosure, wherein the first radio signal comprises K second-type reference signals; the K second-type reference signals are respectively used for demodulations of the K first-type sub-signals, and a reference signal port (reference signal ports) of any of the K second-type reference signals comprises (comprise) the target reference signal port.

According to one aspect of the present disclosure, wherein a pattern of a given first-type reference-signal port comprises one or more of a time-domain density, a frequency-domain density, a sample-density parameter group or a resource-element offset of a given first-type reference signal; the given first-type reference-signal port is any of the K first-type reference-signal ports, and the given first-type reference signal is one of the K first-type reference signals transmitted by the given first-type reference-signal port.

According to one aspect of the present disclosure, comprising:
    receiving first information;
    herein, the first information comprises first sub-information; the first sub-information is used for determining a first MCS threshold set, the first MCS threshold set comprising M1 MCS threshold(s), M1 being a positive integer, and the first MCS threshold set is used for determining a time-domain density of any of the K first-type reference signals.

According to one aspect of the present disclosure, comprising:

receiving first information;

herein, the first information comprises second sub-information; the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals.

According to one aspect of the present disclosure, comprising:

receiving first information;

herein, the first information comprises first sub-information and second sub-information; the first sub-information is used for determining a first MCS threshold set, the first MCS threshold set comprising M1 MCS threshold(s), M1 being a positive integer, and the first MCS threshold set is used for determining a time-domain density of any of the K first-type reference signals; the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals.

According to one aspect of the present disclosure, comprising:

receiving a second information set;

herein, the second information set comprises K1 piece(s) of second information, K1 being a positive integer no greater than the K; the K1 piece(s) of second information corresponds (respectively correspond) to K1 first-type reference signal(s) in the K first-type reference signals; L1 piece(s) of second information in the K1 piece(s) of second information comprises (respectively comprise) L1 piece(s) of third sub-information, L2 piece(s) of second information in the K1 piece(s) of second information comprises (respectively comprise) L2 piece(s) of fourth sub-information, L1 and L2 being non-negative integers no greater than the K1; the L1 piece(s) of third sub-information is (are respectively) used for determining L1 MCS threshold set(s), any of the L1 MCS threshold set(s) comprises a positive integer number of MCS threshold(s), the L1 MCS threshold set(s) is (are respectively) used for determining time-domain density (densities) of L1 first-type reference signal(s), and the L1 first-type reference signal(s) is (are respectively) first-type reference signal(s) in the K first-type reference signals corresponding to the L1 piece(s) of second information; the L2 piece(s) of fourth sub-information is (are respectively) used for determining L2 bandwidth threshold set(s), any of the L2 bandwidth threshold set(s) comprises a positive integer number of bandwidth threshold(s), the L2 bandwidth threshold set(s) is (are respectively) used for determining frequency-domain density (densities) or sample-density parameter group(s) of L2 first-type reference signal(s), and the L2 first-type reference signal(s) is (are respectively) first-type reference signal(s) in the K first-type reference signals corresponding to the L2 piece(s) of second information.

In one embodiment, the above method is advantageous in that: each TRP/panel is allowed to define an MCS threshold and a bandwidth threshold independently for a PTRS pattern selection, which helps a PTRS pattern of each TRP/panel match channel environment better, thus improving reliability of channel estimation, transmission efficiency, as well as transmission reliability.

According to one aspect of the present disclosure, comprising:

receiving third information;

herein, the third information is used for determining a first resource-element offset, and a resource-element offset of any of the K first-type reference signals is the first resource-element offset.

According to one aspect of the present disclosure, comprising:

receiving a fourth information set;

herein, the fourth information set comprises K2 piece(s) of fourth information, K2 being a positive integer no greater than the K; the K2 piece(s) of fourth information corresponds (respectively correspond) to K2 first-type reference signal(s) in the K first-type reference signals; the K2 piece(s) of fourth information is (are respectively) used for determining K2 resource-element offset(s), and resource-element offset(s) of the K2 first-type reference signal(s) is (are respectively) the K2 resource-element offset(s).

The present disclosure provides a method in a base station for wireless communications, comprising:

transmitting a first signaling; and performing a first radio signal, the first radio signal comprising K first-type sub-signals and K first-type reference signals, K being a positive integer greater than 1;

herein, the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; the performing action is receiving, or, the performing action is transmitting.

According to one aspect of the present disclosure, wherein the first radio signal comprises K second-type reference signals; the K second-type reference signals are respectively used for demodulations of the K first-type sub-signals, and a reference signal port (reference signal ports) of any of the K second-type reference signals comprises (comprise) the target reference signal port.

According to one aspect of the present disclosure, wherein a pattern of a given first-type reference-signal port comprises one or more of a time-domain density, a frequency-domain density, a sample-density parameter group or a resource-element offset of a given first-type reference signal; the given first-type reference-signal port is any of the K first-type reference-signal ports, and the given first-type reference signal is one of the K first-type reference signals transmitted by the given first-type reference-signal port.

According to one aspect of the present disclosure, comprising:

transmitting first information;

herein, the first information comprises first sub-information; the first sub-information is used for determining a first MCS threshold set, the first MCS threshold set comprising M1 MCS threshold(s), M1 being a positive integer, and the first MCS threshold set is used for determining a time-domain density of any of the K first-type reference signals.

According to one aspect of the present disclosure, comprising:

transmitting first information;

herein, the first information comprises second sub-information; the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals.

According to one aspect of the present disclosure, comprising:

transmitting first information;

herein, the first information comprises first sub-information and second sub-information; the first sub-information is used for determining a first MCS threshold set, the first MCS threshold set comprising M1 MCS threshold(s), M1 being a positive integer, and the first MCS threshold set is used for determining a time-domain density of any of the K first-type reference signals; the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals.

According to one aspect of the present disclosure, comprising:

transmitting a second information set;

herein, the second information set comprises K1 piece(s) of second information, K1 being a positive integer no greater than the K; the K1 piece(s) of second information corresponds (respectively correspond) to K1 first-type reference signal(s) in the K first-type reference signals; L1 piece(s) of second information in the K1 piece(s) of second information comprises (respectively comprise) L1 piece(s) of third sub-information, L2 piece(s) of second information in the K1 piece(s) of second information comprises (respectively comprise) L2 piece(s) of fourth sub-information, L1 and L2 being non-negative integers no greater than the K1; the L1 piece(s) of third sub-information is (are respectively) used for determining L1 MCS threshold set(s), any of the L1 MCS threshold set(s) comprises a positive integer number of MCS threshold(s), the L1 MCS threshold set(s) is (are respectively) used for determining time-domain density (densities) of L1 first-type reference signal(s), and the L1 first-type reference signal(s) is (are respectively) first-type reference signal(s) in the K first-type reference signals corresponding to the L1 piece(s) of second information; the L2 piece(s) of fourth sub-information is (are respectively) used for determining L2 bandwidth threshold set(s), any of the L2 bandwidth threshold set(s) comprises a positive integer number of bandwidth threshold(s), the L2 bandwidth threshold set(s) is (are respectively) used for determining frequency-domain density (densities) or sample-density parameter group(s) of L2 first-type reference signal(s), and the L2 first-type reference signal(s) is (are respectively) first-type reference signal(s) in the K first-type reference signals corresponding to the L2 piece(s) of second information.

According to one aspect of the present disclosure, comprising:

transmitting third information;

herein, the third information is used for determining a first resource-element offset, and a resource-element offset of any of the K first-type reference signals is the first resource-element offset.

According to one aspect of the present disclosure, comprising:

transmitting a fourth information set;

herein, the fourth information set comprises K2 piece(s) of fourth information, K2 being a positive integer no greater than the K; the K2 piece(s) of fourth information corresponds (respectively correspond) to K2 first-type reference signal(s) in the K first-type reference signals; the K2 piece(s) of fourth information is (are respectively) used for determining K2 resource-element offset(s), and resource-element offset(s) of the K2 first-type reference signal(s) is (are respectively) the K2 resource-element offset(s).

The present disclosure provides a UE for wireless communications, comprising:

a first receiver, receiving a first signaling;

a first processor, operating a first radio signal, the first radio signal comprising K first-type sub-signals and K first-type reference signals, K being a positive integer greater than 1;

herein, the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; the operating action is transmitting, or the operating action is receiving.

The present disclosure provides a base station for wireless communications, comprising:

a first transmitter, transmitting a first signaling; and a second processor, performing a first radio signal, the first radio signal comprising K first-type sub-signals and K first-type reference signals, K being a positive integer greater than 1;

herein, the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; the performing action is receiving, or, the performing action is transmitting.

In one embodiment, the present disclosure has the following advantages over conventional schemes:

In multi-TRP/panel transmissions, different TRPs/panels are allowed to use a same DMRS port, which reduces a signaling overhead; meanwhile, PTRSs associated with a same DMRS port but targeted at different TRPs/panels are allowed to determine their own PTRS patterns based on requirements, thus improving reliability of channel estimation, transmission efficiency, and transmission reliability.

Each TRP/panel is allowed to define an MCS threshold and a bandwidth threshold independently for a PTRS pattern selection, which helps a PTRS pattern of each TRP/panel match channel environment better, thus improving PTRS efficiency.

BRIEF DESCRIPTION OF THE DRAWINGS

Other features, objects and advantages of the present disclosure will become more apparent from the detailed description of non-restrictive embodiments taken in conjunction with the following drawings:

FIG. 9 illustrates a schematic diagram of a first signaling being used for determining time-frequency resources occupied by a first radio signal according to one embodiment of the present disclosure.

FIG. 17 illustrates a schematic diagram of there existing two of K first-type reference-signal ports that have different patterns according to one embodiment of the present disclosure.

FIG. 18 illustrates a schematic diagram of first information according to one embodiment of the present disclosure.

FIG. 19 illustrates a schematic diagram of first information according to one embodiment of the present disclosure.

FIG. 20 illustrates a schematic diagram of first information according to one embodiment of the present disclosure.

FIG. 22 illustrates a schematic diagram of a given bandwidth threshold set being used for determining a frequency-domain density of a given first-type reference signal according to one embodiment of the present disclosure.

FIG. 24 illustrates a schematic diagram of a second information set according to one embodiment of the present disclosure.

FIG. 27 illustrates a schematic diagram of a fourth information set according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
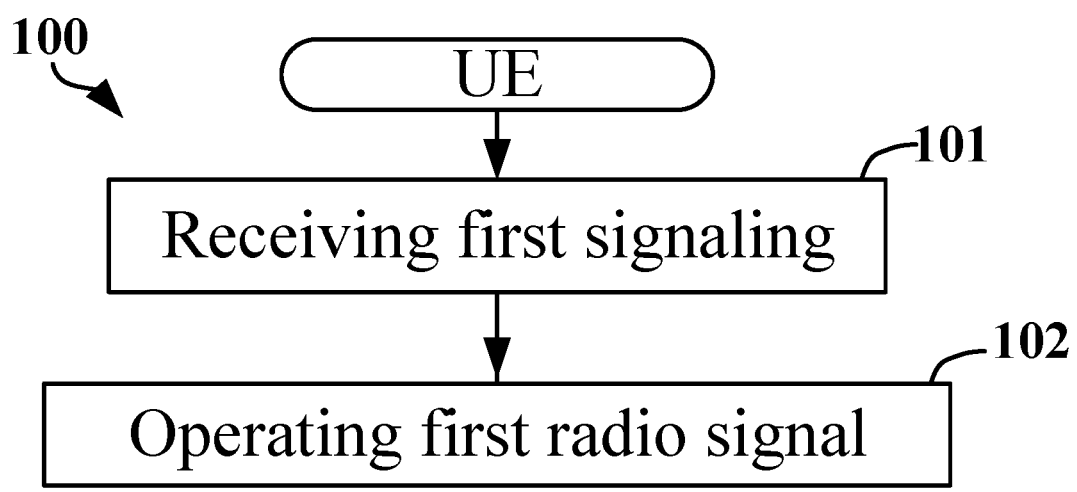
FIG. 1 illustrates a flowchart of a first signaling and a first radio signal according to one embodiment of the present disclosure.

Embodiment 1 illustrates a flowchart of a first signaling and a first radio signal according to one embodiment of the present disclosure, as shown in FIG. 1. In step 100 illustrated by FIG. 1, each box represents a step. Particularly, how steps marked by the boxes are arranged does not represent a chronological order of characteristics of these steps. and in particular, the order of steps in boxes does not represent chronological order of characteristics between the steps.

In Embodiment 1, the UE in the present disclosure receives a first signaling in step 101; operates a first radio signal in step 102. Herein, the first radio signal comprises K first-type sub-signals and K first-type reference signals, K being a positive integer greater than 1; the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; the operating action is transmitting, or the operating action is receiving.

In one embodiment, the first signaling comprises scheduling information of the first radio signal.

In one embodiment, the K is equal to 2.

In one embodiment, the K is greater than 2.

In one embodiment, frequency-domain resources occupied by the K first-type sub-signals belong to a same Carrier.

In one embodiment, frequency-domain resources occupied by the K first-type sub-signals belong to a same Bandwidth Part (BWP).

In one embodiment, the K first-type sub-signals corresponding to a same Modulation and Coding Scheme (MCS).

In one embodiment, there exist two of the K first-type sub-signals that correspond to different MCSs.

In one embodiment, the K first-type sub-signals correspond to a same Hybrid Automatic Repeat request (HARD) process number.

In one embodiment, the K first-type sub-signals correspond to a same Redundancy Version (RV).

In one embodiment, there exist two of the K first-type sub-signals that correspond to different RVs.

In one embodiment, a first sub-signal and a second sub-signal are two of the K first-type sub-signals; a first antenna port and a second antenna port are respectively transmission antenna ports of the first sub-signal and the second sub-signal, and the first antenna port and the second antenna port cannot be assumed to be Quasi Co-Located (QCL).

In one subembodiment of the above embodiment, the K is equal to 2, and the K first-type sub-signals consist of the first sub-signal and the second sub-signal.

In one subembodiment of the above embodiment, the K is greater than 2, and the first sub-signal and the second sub-signal are any two of the K first-type sub-signals.

In one subembodiment of the above embodiment, the first sub-signal is transmitted by multiple antenna ports, and the first antenna port is any of the multiple antenna ports.

In one subembodiment of the above embodiment, the second sub-signal is transmitted by multiple antenna ports, and the second antenna port is any of the multiple antenna ports.

In one embodiment, two antenna ports being QCL refers to that large-scale properties of a channel that a radio signal transmitted by one of the two antenna ports goes through can be used for inferring large-scale properties of a channel that a radio signal transmitted by the other one of the two antenna ports goes through.

In one embodiment, the large-scale properties comprise one or more of delay spread, Doppler spread, Doppler shift, average gain, average delay or Spatial Rx parameters.

In one embodiment, the specific meaning of the QCL can be found in 3GPP TS38. 211, section 4.4.

In one embodiment, each of the K first-type sub-signals carries a first bit block, the first bit block comprising a positive integer number of bit(s).

In one subembodiment of the above embodiment, any of the K first-type sub-signals is an output after bits in the first bit block sequentially through Cyclic Redundancy Check (CRC) Attachment, Segmentation, Coding block (CB) level CRC Attachment, Channel Coding, Rate Matching, Concatenation, Scrambling, Modulation Mapper, Layer Mapper, transform precoder, Precoding, Resource Element Mapper, Multicarrier Symbol Generation, and Modulation and Upconversion.

In one subembodiment of the above embodiment, any of the K first-type sub-signals is an output after bits in the first bit block sequentially through CRC Attachment, Segmentation, CB-level CRC Attachment, Channel Coding, Rate Matching, Concatenation, Scrambling, Modulation Mapper, Layer Mapper, Precoding, Resource Element Mapper, Multicarrier Symbol Generation, and Modulation and Upconversion.

In one subembodiment of the above embodiment, the first bit block is used for generating any of the K first-type sub-signals.

In one subembodiment of the above embodiment, the first bit block is a Transport Block (TB).

In one subembodiment of the above embodiment, the first bit block comprises a TB.

In one embodiment, the K first-type sub-signals respectively carry K bit blocks, and any of the K bit blocks comprises a positive integer number of bit(s).

In one subembodiment of the above embodiment, any first-type sub-signal of the K first-type sub-signals is unrelated to any of the K bit blocks other than its corresponding bit block.

In one subembodiment of the above embodiment, any of the K first-type sub-signals is an output after bits in its corresponding bit block sequentially through CRC Attachment, Segmentation, CB-level CRC Attachment, Channel Coding, Rate Matching, Concatenation, Scrambling, Modulation Mapper, Layer Mapper, transform precoder, Precoding, Resource Element Mapper, Multicarrier Symbol Generation, and Modulation and Upconversion.

In one subembodiment of the above embodiment, any of the K first-type sub-signals is an output after bits in its corresponding bit block sequentially through CRC Attachment, Segmentation, CB-level CRC Attachment, Channel Coding, Rate Matching, Concatenation, Scrambling, Modulation Mapper, Layer Mapper, Precoding, Resource Element Mapper, Multicarrier Symbol Generation, and Modulation and Upconversion.

In one subembodiment of the above embodiment, the K bit blocks are respectively used for generating the K first-type sub-signals.

In one subembodiment of the above embodiment, the K bit blocks are respectively K TBs.

In one subembodiment of the above embodiment, the K bit blocks respectively comprise K TBs.

In one embodiment, the Multicarrier Symbol Generation is an Orthogonal Frequency Division Multiplexing (OFDM) symbol generation.

In one embodiment, the Multicarrier Symbol Generation is a Single Carrier-Frequency Division Multiple Access (SC-FDMA) symbol generation.

In one embodiment, the Multicarrier Symbol Generation is a Discrete Fourier Transform Spread OFDM (DFT-S-OFDM) symbol generation.

In one embodiment, the K first-type reference signals comprise PTRSs.

In one embodiment, frequency-domain resources occupied by the K first-type reference signals belong to a same Carrier.

In one embodiment, frequency-domain resources occupied by the K first-type reference signals belong to a same BWP.

In one embodiment, a number of subcarrier(s) occupied by any of the K first-type reference signals in frequency domain is related to a number of scheduled Resource Block(s) (RB) of its corresponding first-type sub-signal, and is unrelated to a number of scheduled RB(s) of any of the K first-type sub-signals other than the corresponding first-type sub-signal.

In one embodiment, a number of subcarrier(s) occupied by any of the K first-type reference signals in frequency domain is related to a number of RB(s) occupied by its corresponding first-type sub-signal, and is unrelated to a number of RB(s) occupied by any of the K first-type sub-signals other than the corresponding first-type sub-signal.

In one embodiment, a number of multicarrier symbol(s) occupied by any of the K first-type reference signals in time domain is related to a scheduled MCS of its corresponding first-type sub-signal, and is unrelated to a scheduled MCS of any of the K first-type sub-signals other than the corresponding first-type sub-signal.

In one embodiment, the phrase that the K first-type reference signals are respectively used for channel estimation of the K first-type sub-signals comprises that a channel that any of the K first-type reference signals goes through is used for determining a channel that its corresponding first-type sub-signal goes through.

In one embodiment, the phrase that the K first-type reference signals are respectively used for channel estimation of the K first-type sub-signals comprises that a channel that any of the K first-type reference signals goes through is used for determining phase of a channel that its corresponding first-type sub-signal goes through.

In one embodiment, the phrase that the K first-type reference signals are respectively used for channel estimation of the K first-type sub-signals comprises that the K first-type reference signals are respectively PTRSs of the K first-type sub-signals.

In one embodiment, the UE receives the first radio signal.

In one embodiment, the UE transmits the first radio signal.

Embodiment 2

Figure 2:
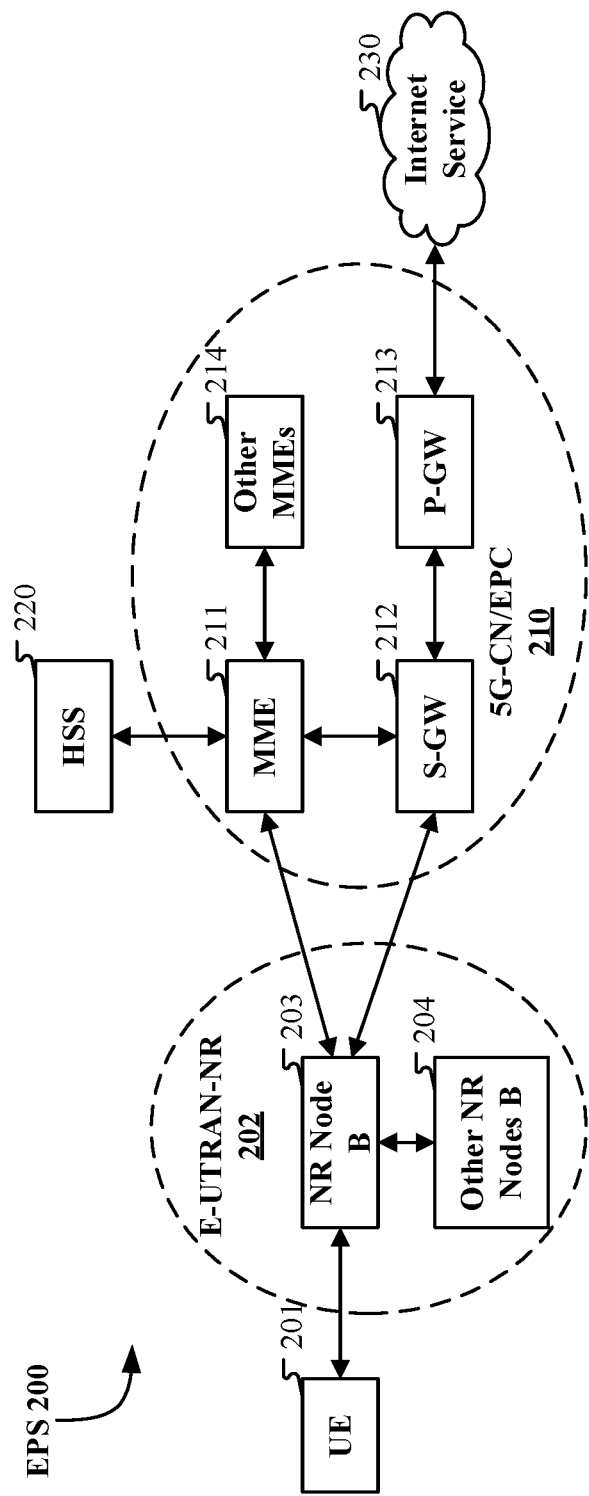
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The EPS 200 may comprise one or more UEs 201, an E-UTRAN-NR 202, a 5G-Core Network/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201-oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrowband physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises an MME 211, other MMEs 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the gNB 203 corresponds to the base station in the present disclosure.

In one embodiment, the UE 201 corresponds to the UE in the present disclosure.

In one embodiment, the gNB 203 supports multi-TRP/panel-based transmissions.

In one embodiment, the UE 201 supports multi-TRP/panel-based transmissions.

Embodiment 3

Figure 3:
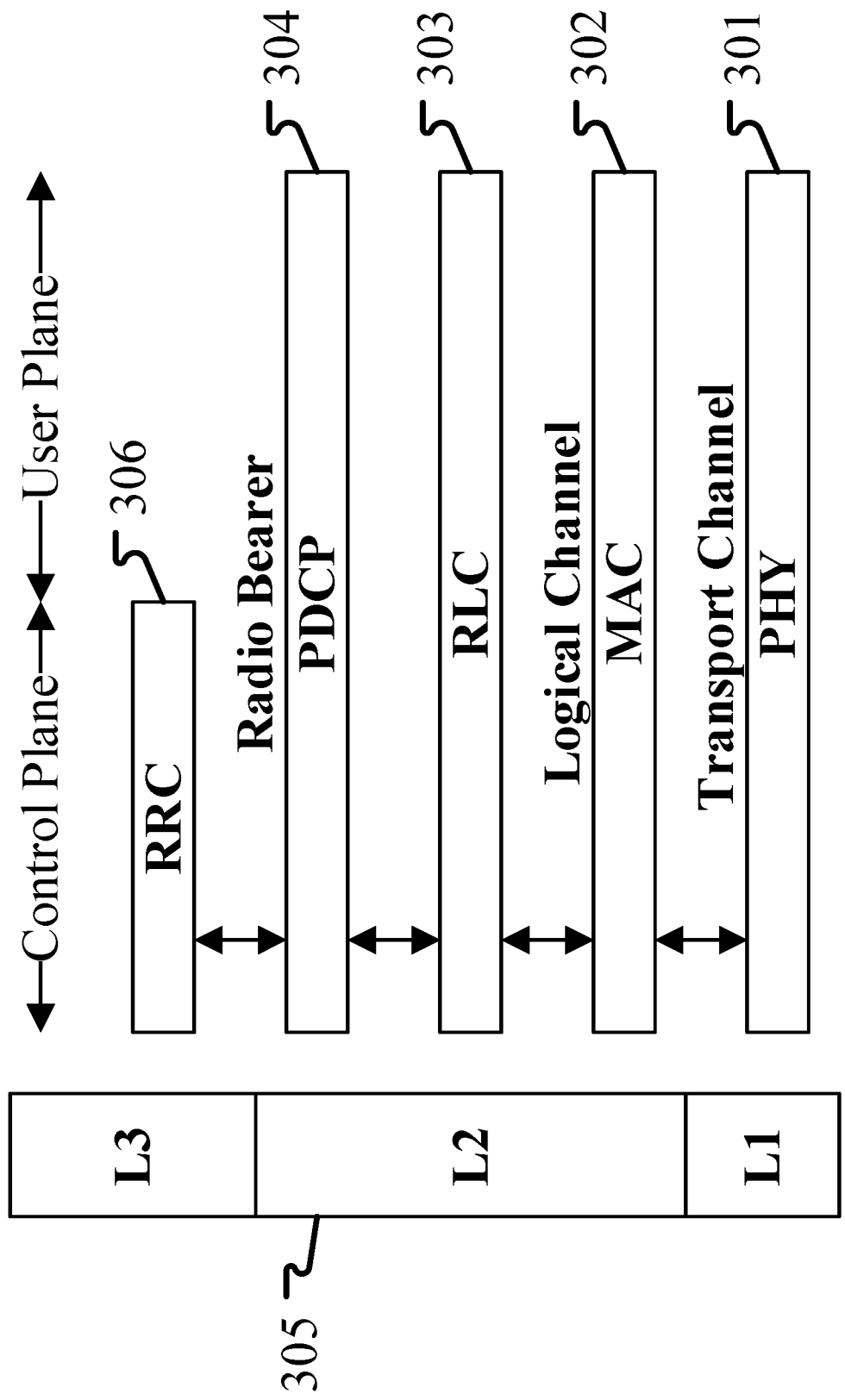
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301.

In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first signaling in the present disclosure is generated by the RRC sublayer 306.

In one embodiment, the first signaling in the present disclosure is generated by the MAC sublayer 302.

In one embodiment, the first radio signal in the present disclosure is generated by the PHY 301.

In one embodiment, each of the K first-type sub-signals is generated by the PHY 301.

In one embodiment, each of the K first-type reference signals is generated by the PHY 301.

In one embodiment, each of the K second-type reference signals is generated by the PHY 301.

In one embodiment, the first information in the present disclosure is generated by the RRC sublayer 306.

In one embodiment, the first information in the present disclosure is generated by the MAC sublayer 302.

In one embodiment, each of the K1 piece(s) of second information in the present disclosure is generated by the RRC sublayer 306.

In one embodiment, each of the K1 piece(s) of second information in the present disclosure is generated by the MAC sublayer 302.

In one embodiment, the third information in the present disclosure is generated by the RRC sublayer 306.

In one embodiment, the third information in the present disclosure is generated by the MAC sublayer 302.

In one embodiment, each of the K2 piece(s) of fourth information in the present disclosure is generated by the RRC sublayer 306.

In one embodiment, each of the K2 piece(s) of fourth information in the present disclosure is generated by the MAC sublayer 302.

Embodiment 4

Figure 4:
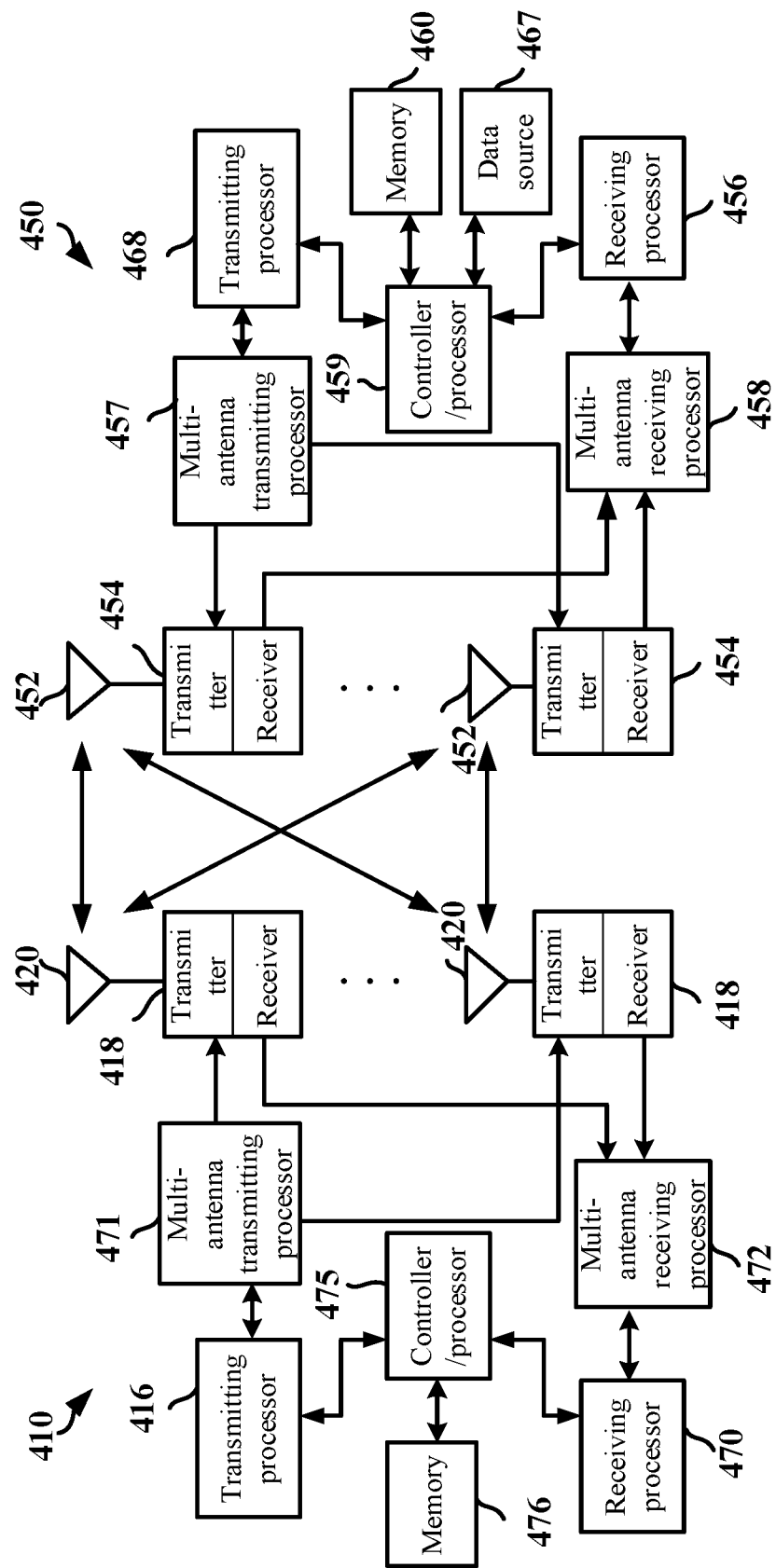
FIG. 4 illustrates a schematic diagram of a New Radio (NR) node and a UE according to one embodiment of the present disclosure.

Embodiment 4 illustrates a schematic diagram of a NR node and a UE according to one embodiment of the present disclosure, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory comprises computer program codes; the at least one memory and the computer program codes are configured to be used in collaboration with the at least one processor. The UE 450 at least receives the first signaling in the present disclosure; and transmits the first signaling in the present disclosure; herein, the first radio signal comprises K first-type sub-signals and K first-type reference signals, K being a positive integer greater than 1; the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns.

In one embodiment, the UE 450 comprises a memory that stores a computer readable instruction program. The computer readable instruction program generates an action when executed by at least one processor. The action includes receiving the first signaling in the present disclosure; and transmitting the first radio signal in the present disclosure; herein, the first radio signal comprises K first-type sub-signals and K first-type reference signals, K being a positive integer greater than 1; the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns.

In one embodiment, the gNB 410 comprises at least one processor and at least one memory. The at least one memory comprises computer program codes; the at least one memory and the computer program codes are configured to be used in collaboration with the at least one processor. The gNB 410 at least transmits the first signaling in the present disclosure; and receives the first radio signal in the present disclosure; herein, the first radio signal comprises K first-type sub-signals and K first-type reference signals, K being a positive integer greater than 1; the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns.

In one embodiment, the gNB 410 comprises a memory that stores a computer readable instruction program. The computer readable instruction program generates an action when executed by at least one processor. The action includes transmitting the first signaling in the present disclosure; and receiving the first radio signal in the present disclosure; herein, the first radio signal comprises K first-type sub-signals and K first-type reference signals, K being a positive integer greater than 1; the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns.

In one embodiment, the UE 450 comprises at least one processor and at least one memory. The at least one memory comprises computer program codes; the at least one memory and the computer program codes are configured to be used in collaboration with the at least one processor. The UE 450 at least receives the first signaling in the present disclosure; and receives the first radio signal in the present disclosure; herein, the first radio signal comprises K first-type sub-signals and K first-type reference signals, K being a positive integer greater than 1; the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns.

In one embodiment, the UE 450 comprises a memory that stores a computer readable instruction program. The computer readable instruction program generates an action when executed by at least one processor. The action includes receiving the first signaling in the present disclosure; and receiving the first radio signal in the present disclosure. herein, the first radio signal comprises K first-type sub-signals and K first-type reference signals, K being a positive integer greater than 1; the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns.

In one embodiment, the gNB 410 comprises at least one processor and at least one memory. The at least one memory comprises computer program codes; the at least one memory and the computer program codes are configured to be used in collaboration with the at least one processor. The gNB 410 at least transmits the first signaling in the present disclosure; and transmits the first signaling in the present disclosure; herein, the first radio signal comprises K first-type sub-signals and K first-type reference signals, K being a positive integer greater than 1; the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of K first-type reference-signal ports that have different patterns.

In one embodiment, the gNB 410 comprises a memory that stores a computer readable instruction program. The computer readable instruction program generates an action when executed by at least one processor. The action includes transmitting the first signaling in the present disclosure; and transmitting the first radio signal in the present disclosure; herein, the first radio signal comprises K first-type sub-signals and K first-type reference signals, K being a positive integer greater than 1; the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns.

In one embodiment, the gNB 410 corresponds to the base station in the present disclosure.

In one embodiment, the UE 450 corresponds to the UE in the present disclosure.

In one embodiment, at least one of the antenna 452, the receiver 454, the receiving processor 456, the multi-antenna receiving processor 458, the controller/processor 459, the memory 460, or the data source 467 is used for receiving the first signaling in the present disclosure; at least one of the antenna 420, the transmitter 418, the transmitting processor 416, the multi-antenna transmitting processor 471, the controller/processor 475, or the memory 476 is used for transmitting the first signaling in the present disclosure.

In one embodiment, at least one of the antenna 420, the receiver 418, the receiving processor 470, the multi-antenna receiving processor 472, the controller/processor 475, or the memory 476 is used for receiving the first radio signal in the present disclosure; at least one of the antenna 452, the transmitter 454, the transmitting processor 468, the multi-antenna transmitting processor 457, the controller/processor 459, the memory 460, or the data source 467 is used for transmitting the first radio signal in the present disclosure.

In one embodiment, at least one of the antenna 452, the receiver 454, the receiving processor 456, the multi-antenna receiving processor 458, the controller/processor 459, the memory 460, or the data source 467 is used for receiving the first radio signal of the present disclosure; at least one of the antenna 420, the transmitter 418, the transmitting processor 416, the multi-antenna transmitting processor 471, the controller/processor 475, or the memory 476 is used for transmitting the first radio signal of the present disclosure.

In one embodiment, at least one of the antenna 420, the receiver 418, the receiving processor 470, the multi-antenna receiving processor 472, the controller/processor 475, or the memory 476 is used for receiving the K first-type reference signals in the present disclosure; at least one of the antenna 452, the transmitter 454, the transmitting processor 468, the multi-antenna transmitting processor 457, the controller/processor 459, the memory 460, or the data source 467 is used for transmitting the K first-type reference signals in the present disclosure.

In one embodiment, at least one of the antenna 452, the receiver 454, the receiving processor 456, the multi-antenna receiving processor 458, the controller/processor 459, the memory 460, or the data source 467 is used for receiving the K first-type reference signals in the present disclosure; at least one of the antenna 420, the transmitter 418, the transmitting processor 416, the multi-antenna transmitting processor 471, the controller/processor 475, or the memory 476 is used for transmitting the K first-type reference signals in the present disclosure.

In one embodiment, at least one of the antenna 420, the receiver 418, the receiving processor 470, the multi-antenna receiving processor 472, the controller/processor 475, or the memory 476 is used for receiving the K second-type reference signals in the present disclosure; at least one of the antenna 452, the transmitter 454, the transmitting processor 468, the multi-antenna transmitting processor 457, the controller/processor 459, the memory 460, or the data source 467 is used for transmitting the K second-type reference signals in the present disclosure.

In one embodiment, at least one of the antenna 452, the receiver 454, the receiving processor 456, the multi-antenna receiving processor 458, the controller/processor 459, the memory 460, or the data source 467 is used for receiving the K second-type reference signals in the present disclosure; at least one of the antenna 420, the transmitter 418, the transmitting processor 416, the multi-antenna transmitting processor 471, the controller/processor 475, or the memory 476 is used for transmitting the K second-type reference signals in the present disclosure.

In one embodiment, at least one of the antenna 452, the receiver 454, the receiving processor 456, the multi-antenna receiving processor 458, the controller/processor 459, the memory 460, or the data source 467 is used for receiving the first information in the present disclosure; at least one of the antenna 420, the transmitter 418, the transmitting processor 416, the multi-antenna transmitting processor 471, the controller/processor 475, or the memory 476 is used for transmitting the first information in the present disclosure.

In one embodiment, at least one of the antenna 452, the receiver 454, the receiving processor 456, the multi-antenna receiving processor 458, the controller/processor 459, the memory 460, or the data source 467 is used for receiving the second information set in the present disclosure; at least one of the antenna 420, the transmitter 418, the transmitting processor 416, the multi-antenna transmitting processor 471, the controller/processor 475, or the memory 476 is used for transmitting the second information set in the present disclosure.

In one embodiment, at least one of the antenna 452, the receiver 454, the receiving processor 456, the multi-antenna receiving processor 458, the controller/processor 459, the memory 460, or the data source 467 is used for receiving the third information in the present disclosure; at least one of the antenna 420, the transmitter 418, the transmitting processor 416, the multi-antenna transmitting processor 471, the controller/processor 475, or the memory 476 is used for transmitting the third information in the present disclosure.

In one embodiment, at least one of the antenna 452, the receiver 454, the receiving processor 456, the multi-antenna receiving processor 458, the controller/processor 459, the memory 460, or the data source 467 is used for receiving the fourth information set in the present disclosure; at least one of the antenna 420, the transmitter 418, the transmitting processor 416, the multi-antenna transmitting processor 471, the controller/processor 475, or the memory 476 is used for transmitting the fourth information set in the present disclosure.

Embodiment 5

Figure 5:
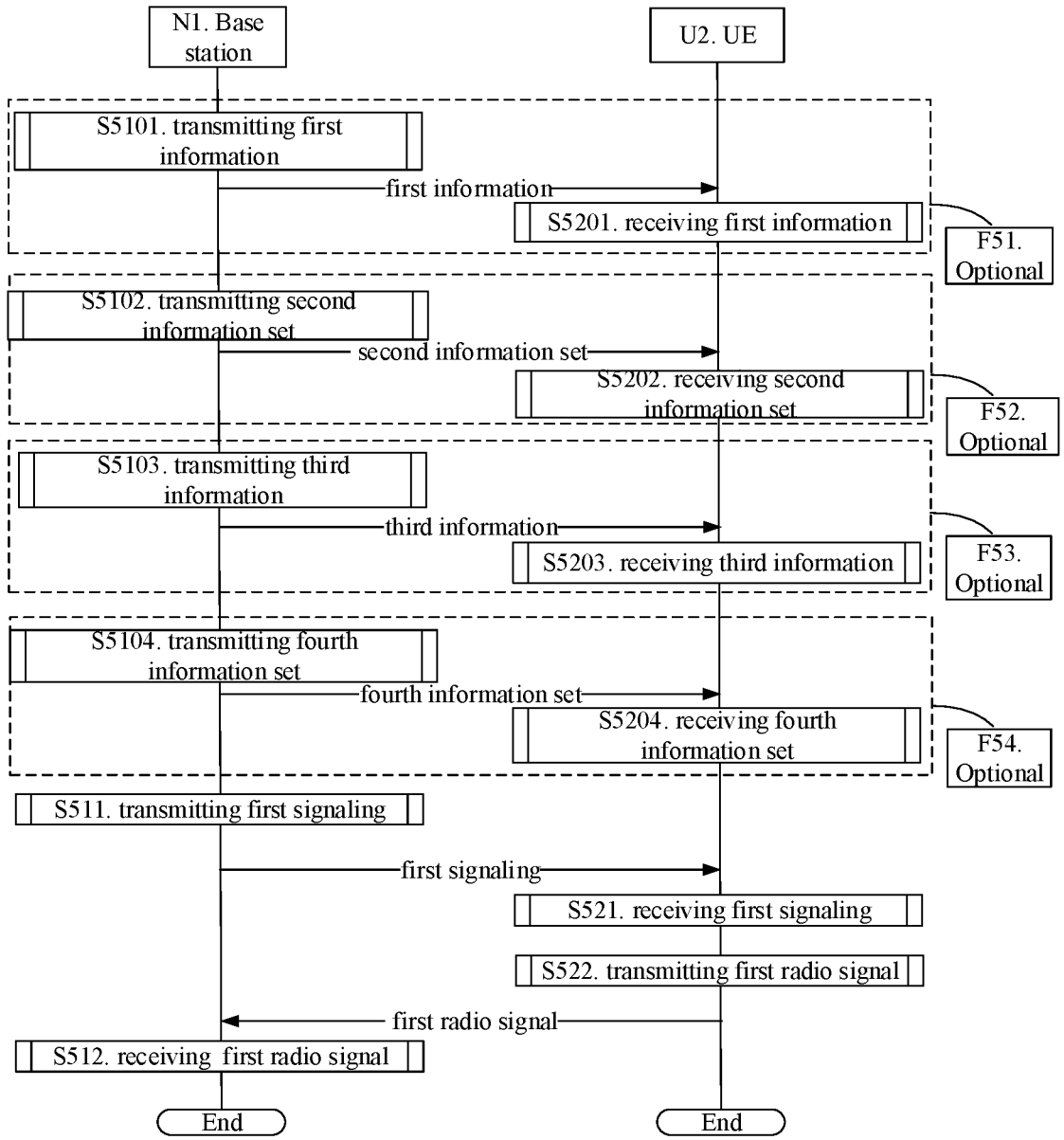
FIG. 5 illustrates a flowchart of wireless communications according to one embodiment of the present disclosure.

Embodiment 5 illustrates a flowchart of wireless communications according to one embodiment in the present disclosure, as shown in FIG. 5. In FIG. 5, a base station N1 is a maintenance base station for a serving cell of a UE U2. In FIG. 5, steps in F51 to F54 are respectively optional; herein, steps in box F51 and box F52 cannot exist simultaneously, and steps in box F53 and box F54 cannot exist simultaneously.

The N1 transmits first information in step S5101; transmits a second information set in step S5102; transmits third information in step S5103; transmits a fourth information set in step S5104; transmits a first signaling in step S511; and receives a first radio signal in step S512.

The U2 receives first information in step S5201; receives a second information set in step S5202; receives third information in step S5203; receives a fourth information set in step S5204; receives a first signaling in step S521; and transmits a first radio signal in step S522.

In Embodiment 5, the first radio signal comprises K first-type sub-signals and K first-type reference signals, K being a positive integer greater than 1; the first signaling is used by the U2 for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; a pattern of a given first-type reference-signal port comprises one or more of a time-domain density, a frequency-domain density, a sample-density parameter group or a resource-element offset of a given first-type reference signal; the given first-type reference-signal port is any of the K first-type reference-signal ports, and the given first-type reference signal is one of the K first-type reference signals transmitted by the given first-type reference-signal port. The first information comprises at least one of first sub-information or second sub-information. When the first information comprises the first sub-information, the first sub-information being used by the U2 for determining a first MCS threshold set, the first MCS threshold set comprising M1 MCS threshold(s), M1 being a positive integer; the first MCS threshold set is used by the U2 for determining a time-domain density of any of the K first-type reference signals. When the first information comprises the second sub-information, the second sub-information being used by the U2 for determining a first bandwidth threshold set, the first bandwidth threshold set comprising M2 bandwidth threshold(s), M2 being a positive integer; the first bandwidth threshold set is used by the U2 for determining a frequency-domain density or a sample-density parameter group of any of the K first-type reference signals. The second information set comprises K1 piece(s) of second information, K1 being a positive integer no greater than the K. The K1 piece(s) of second information corresponds (respectively correspond) to K1 first-type reference signal(s) in the K first-type reference signals. L1 piece(s) of second information in the K1 piece(s) of second information comprises (respectively comprise) L1 piece(s) of third sub-information, and L2 piece(s) of second information in the K1 piece(s) of second information comprises (respectively comprise) L2 piece(s) of fourth sub-information, L1 and L2 being non-negative integers no greater than the K1. The L1 piece(s) of third sub-information is (are respectively) used by the U2 for determining L1 MCS threshold set(s), and any of the L1 MCS threshold set(s) comprises a positive integer number of MCS threshold(s); the L1 MCS threshold set(s) is (are respectively) used by the U2 for determining time-domain density (densities) of L1 first-type reference signal(s), and the L1 first-type reference signal(s) is (are respectively) first-type reference signal(s) in the K first-type reference signals corresponding to the L1 piece(s) of second information; the L2 piece(s) of fourth sub-information is (are respectively) used by the U2 for determining L2 bandwidth threshold set(s), and any of the L2 bandwidth threshold set(s) comprises a positive integer number of bandwidth threshold(s); the L2 bandwidth threshold set(s) is (are respectively) used by the U2 for determining frequency-domain density (densities) or sample-density parameter group(s) of L2 first-type reference signal(s), and the L2 first-type reference signal(s) is (are respectively) first-type reference signal(s) in the K first-type reference signals corresponding to the L2 piece(s) of second information. The third information is used by the U2 for determining a first resource-element offset, a resource-element offset of any of the K first-type reference signals is the first resource-element offset. The fourth information set comprises K2 piece(s) of fourth information, K2 being a positive integer no greater than the K. The K2 piece(s) of fourth information corresponds (respectively correspond) to K2 first-type reference signal(s) in the K first-type reference signals; the K2 piece(s) of fourth information is (are respectively) used by the U2 for determining K2 resource-element offset(s), and resource-element offset(s) of the K2 first-type reference signal(s) is (are respectively) the K2 resource-element offset(s).

In one embodiment, the N1 is the base station in the present disclosure.

In one embodiment, the U2 is the UE in the present disclosure.

In one embodiment, the operating action in the present disclosure is transmitting, and the performing action in the present disclosure is receiving.

In one embodiment, the first radio signal comprises K second-type reference signals; the K second-type reference signals are respectively used for demodulations of the K first-type sub-signals, and a reference signal port (reference signal ports) of any of the K second-type reference signals comprises (comprise) the target reference signal port.

In one embodiment, the K second-type reference signals comprise DeModulation Reference Signals (DMRS).

In one embodiment, a pattern of the given first-type reference-signal port comprises a time-domain density of the given first-type reference signal.

In one embodiment, a pattern of the given first-type reference-signal port comprises a frequency-domain density of the given first-type reference signal.

In one embodiment, a pattern of the given first-type reference-signal port comprises a sample-density parameter group of the given first-type reference signal.

In one embodiment, a pattern of the given first-type reference-signal port comprises a resource-element offset of the given first-type reference signal.

In one embodiment, a pattern of the given first-type reference-signal port comprises a time-domain density and a frequency-domain density of the given first-type reference signal.

In one embodiment, a pattern of the given first-type reference-signal port comprises a time-domain density and a sample-density parameter group of the given first-type reference signal.

In one embodiment, a pattern of the given first-type reference-signal port comprises a time-domain density, a frequency-domain density and a resource-element offset of the given first-type reference signal.

In one embodiment, the phrase that there exist two of the K first-type reference-signal ports that have different patterns comprises that there exist two of the K first-type reference signals that have different time-domain densities.

In one embodiment, the phrase that there exist two of the K first-type reference-signal ports that have different patterns comprises that there exist two of the K first-type reference signals that have different frequency-domain densities.

In one embodiment, the phrase that there exist two of the K first-type reference-signal ports that have different patterns comprises that there exist two of the K first-type reference signals that have different sample-density parameter groups.

In one embodiment, the phrase that there exist two of the K first-type reference-signal ports that have different patterns comprises that there exist two of the K first-type reference signals that have different resource-element offsets.

In one embodiment, the MCS refers to a Modulation and Coding Scheme.

In one embodiment, the first signaling is transmitted on a downlink physical layer control channel (i.e., a downlink channel only capable of carrying a physical layer signaling).

In one embodiment, the downlink physical-layer control channel is a Physical Downlink Control CHannel (PDCCH).

In one embodiment, the downlink physical layer control channel is a short PDCCH (sPDCCH).

In one embodiment, the downlink physical layer control channel is a New Radio PDCCH (NR-PDCCH).

In one embodiment, the downlink physical layer control channel is a Narrow Band PDCCH (NB-PDCCH).

In one embodiment, the first radio signal is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a New Radio PDSCH (NR-PDSCH).

In one embodiment, the downlink physical layer data channel is a Narrow Band PDSCH (NB-PDSCH).

In one embodiment, the first radio signal is transmitted on an uplink physical layer data channel (that is, an uplink channel capable of carrying physical layer data), the operating action in the present disclosure is transmitting, and the performing action in the present disclosure is receiving.

In one embodiment, the uplink physical layer data channel is a Physical Uplink Shared CHannel (PUSCH).

In one subembodiment, the uplink physical layer data channel is a short PUSCH (sPUSCH).

In one embodiment, the uplink physical layer data channel is a New Radio PUSCH (NR-PUSCH).

In one embodiment, the uplink physical layer data channel is a Narrow Band PUSCH (NB-PUSCH).

In one embodiment, the first information is transmitted on a downlink physical layer data channel (i.e., a downlink channel capable of carrying physical layer data).

In one embodiment, the K1 piece(s) of second information is(are) transmitted on a downlink physical layer data channel (i.e., a downlink channel capable of carrying physical layer data).

In one embodiment, the K1 piece(s) of second information is(are) transmitted on a same downlink physical layer data channel.

In one embodiment, at least two of the K1 pieces of second information are transmitted on different downlink physical layer data channels.

In one embodiment, the K1 piece(s) of second information is(are) respectively transmitted on K1 downlink physical layer data channel(s).

In one embodiment, the third information is transmitted on a downlink physical layer data channel (i.e., a downlink channel capable of carrying physical layer data).

In one embodiment, the K2 piece(s) of fourth information is(are) transmitted on a downlink physical layer data channel (i.e., a downlink channel capable of carrying physical layer data).

In one embodiment, the K2 piece(s) of fourth information is(are) transmitted on a same downlink physical layer data channel.

In one embodiment, at least two of the K2 pieces of fourth information are transmitted on different downlink physical layer data channels.

In one embodiment, the K2 piece(s) of fourth information is (are respectively) transmitted on K2 downlink physical layer data channel(s).

Embodiment 6

Figure 6:
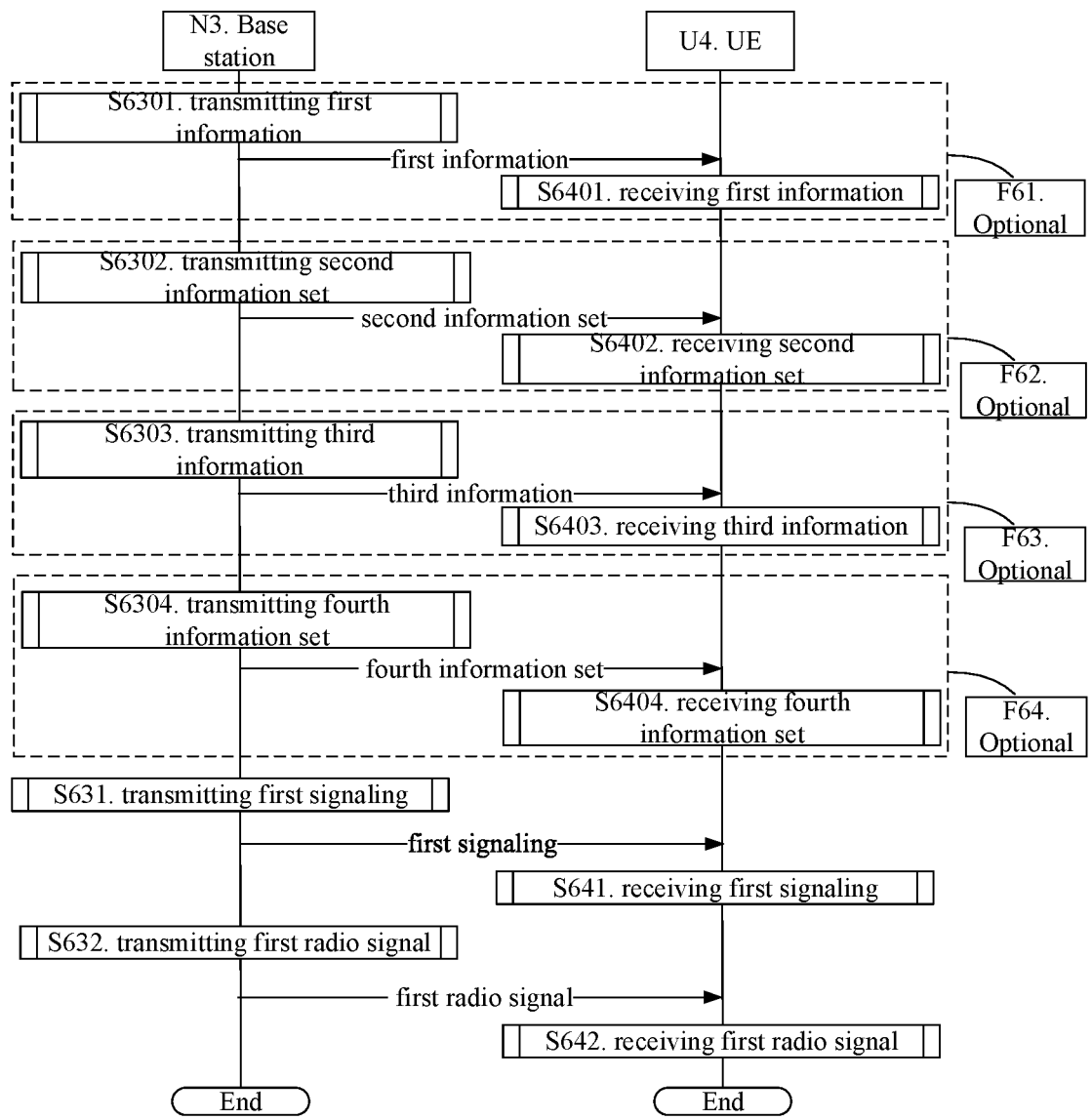
FIG. 6 illustrates a flowchart of wireless communications according to one embodiment of the present disclosure.

Embodiment 6 illustrates a flowchart of wireless communications according to one embodiment in the present disclosure, as shown in FIG. 6. In FIG. 6, a base station N3 is a maintenance base station for a serving cell of a UE U4. In FIG. 6, steps in F61 to F64 are respectively optional; herein, steps in box F61 and box F62 cannot exist simultaneously, and steps in box F63 and box F64 cannot exist simultaneously.

The N3 transmits first information in step S6301; transmits a second information set in step S6302; transmits third information in step S6303; transmits a fourth information set in step S6304; transmits a first signaling in step S631; and transmits a first radio signal in step S632.

The U4 receives first information in step S6401; receives a second information set in step S6402; receives third information in step S6403; receives a fourth information set in step S6404; receives a first signaling in step S641; and receives a first radio signal in step S642.

In one embodiment, the N3 is the base station in the present disclosure.

In one embodiment, the U4 is the UE in the present disclosure.

In one embodiment, the operating action in the present disclosure is receiving, and the performing action in the present disclosure is transmitting.

In one embodiment, the first radio signal is transmitted on a downlink physical layer data channel (i.e., a downlink channel capable of carrying physical layer data), the operating action in the present disclosure is receiving, and the performing action in the present disclosure is transmitting.

In one embodiment, the downlink physical layer data channel is a PDSCH.

In one embodiment, the downlink physical layer data channel is an sPDSCH.

In one embodiment, the downlink physical layer data channel is an NR-PDSCH.

In one embodiment, the downlink physical layer data channel is an NB-PDSCH.

Embodiment 7

Figure 7:
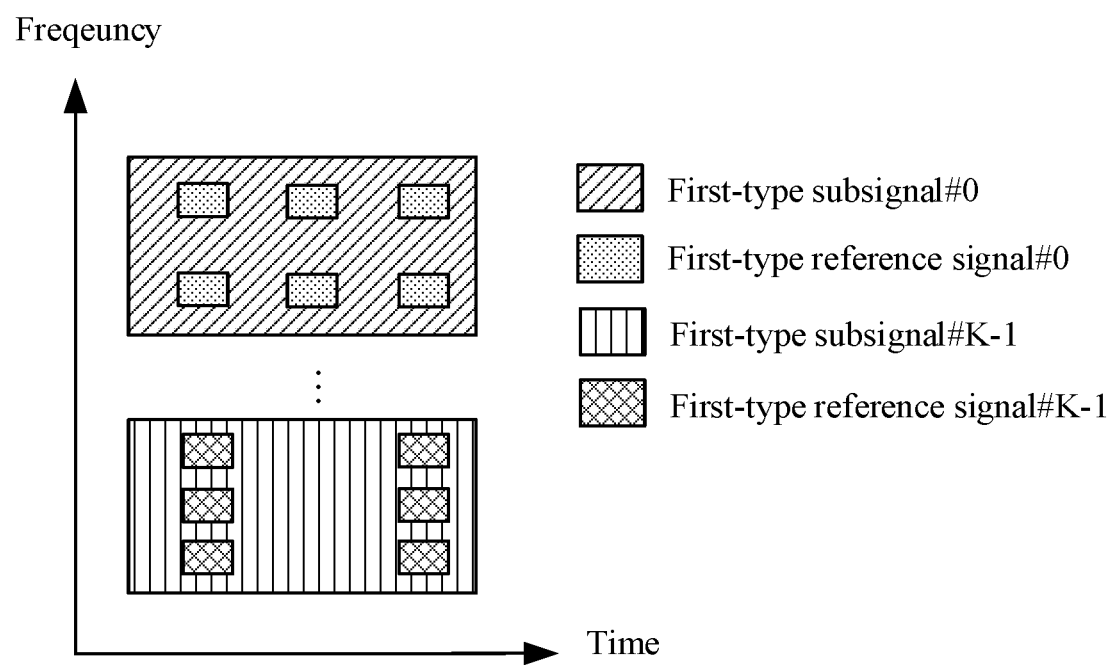
FIG. 7 illustrates a schematic diagram of resources mapping of K first-type sub-signals and K first-type reference signals in time-frequency domain according to one embodiment of the present disclosure.

Embodiment 7 illustrates a schematic diagram of resources mapping of K first-type sub-signals and K first-type reference signals in time-frequency domain according to one embodiment of the present disclosure. as shown in FIG. 7. In Embodiment 7, time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals. In FIG. 7, indexes of the K first-type sub-signals and the K first-type reference signals are respectively #0, . . . , #K−1.

In one embodiment, any of the K first-type sub-signals occupies a positive integer number of multicarrier symbol(s) in time domain.

In one embodiment, any of the K first-type sub-signals occupies a positive integer number of consecutive multicarrier symbols in time domain.

In one embodiment, there at least exists one of the K first-type sub-signals that occupies a positive integer number of inconsecutive multicarrier symbols in time domain.

In one embodiment, the multicarrier symbol is an OFDM symbol.

In one embodiment, the multicarrier symbol is an SC-FDMA symbol.

In one embodiment, the multicarrier symbol is a DFT-S-OFDM symbol.

In one embodiment, any of the K first-type sub-signals occupies a positive integer number of subcarrier(s) in frequency domain.

In one embodiment, any of the K first-type sub-signals occupies a positive integer number of RB(s) in frequency domain.

In one embodiment, any of the K first-type sub-signals occupies a positive integer number of consecutive RBs in frequency domain.

In one embodiment, any of the K first-type sub-signals occupies a positive integer number of Physical Resource Block(s) (PRB) in frequency domain.

In one embodiment, any of the K first-type sub-signals occupies a positive integer number of consecutive PRBs in frequency domain.

In one embodiment, time-domain resources occupied by the K first-type sub-signals are completely overlapping.

In one embodiment, the K is equal to 2, and time-domain resources occupied by the K first-type sub-signals are partially overlapping.

In one embodiment, the K is greater than 2, and time-domain resources occupied by any two of the K first-type sub-signals are partially overlapping.

In one embodiment, sizes of time-domain resources occupied by the K first-type sub-signals are the same.

In one embodiment, there exist two of the K first-type sub-signals that occupy different sizes of time-domain resources.

In one embodiment, sizes of frequency-domain resources occupied by the K first-type sub-signals are the same.

In one embodiment, there exist two of the K first-type sub-signals that occupy different sizes of frequency-domain resources.

In one embodiment, the K first-type reference signals comprise PTRSs.

In one embodiment, the K first-type reference signals respectively comprise K PTRSs.

In one embodiment, the K first-type reference signals are respectively K PTRSs.

In one embodiment, any of the K first-type reference signals occurs many times in time domain.

In one embodiment, at least one of the K first-type reference signals occurs many times in time domain.

In one embodiment, any of the K first-type reference signals occurs at equal intervals in time domain.

In one embodiment, at least one of the K first-type reference signals occurs at equal intervals in time domain.

In one embodiment, any of the K first-type reference signals occurs at unequal intervals in time domain.

In one embodiment, at least one of the K first-type reference signals occurs at unequal intervals in time domain.

In one embodiment, any of the K first-type reference signals occupies a positive integer number of multicarrier symbol(s) in time domain.

In one embodiment, any of the K first-type reference signals occupies a positive integer number of inconsecutive multicarrier symbols in time domain.

In one embodiment, at least one of the K first-type reference signals occupies a positive integer number of inconsecutive multicarrier symbols in time domain.

In one embodiment, any of the K first-type reference signals occupies a positive integer number of consecutive multicarrier symbols in time domain.

In one embodiment, at least one of the K first-type reference signals occupies a positive integer number of consecutive multicarrier symbols in time domain.

In one embodiment, any of the K first-type reference signals occupies a positive integer number of subcarrier(s) in frequency domain.

In one embodiment, any of the K first-type reference signals occupies a positive integer number of inconsecutive subcarriers in frequency domain.

In one embodiment, any of the K first-type sub-signals and any of the K first-type reference signals occupy mutually-orthogonal time-frequency resources.

In one embodiment, time-frequency resources occupied by the K first-type reference signals are mutually orthogonal.

In one embodiment, REs occupied by any first-type reference signal of the K first-type reference signals belong to a time-frequency resource block occupied by its corresponding first-type sub-signal; the time-frequency resource block occupied by the corresponding first-type sub-signal comprises all RBs occupied by the corresponding first-type sub-signals in frequency domain, and all multicarrier symbols occupied by the corresponding first-type sub-signals in time domain.

In one embodiment, an RE occupies a multicarrier symbol in time domain, and a subcarrier in frequency domain.

Embodiment 8

Figure 8:
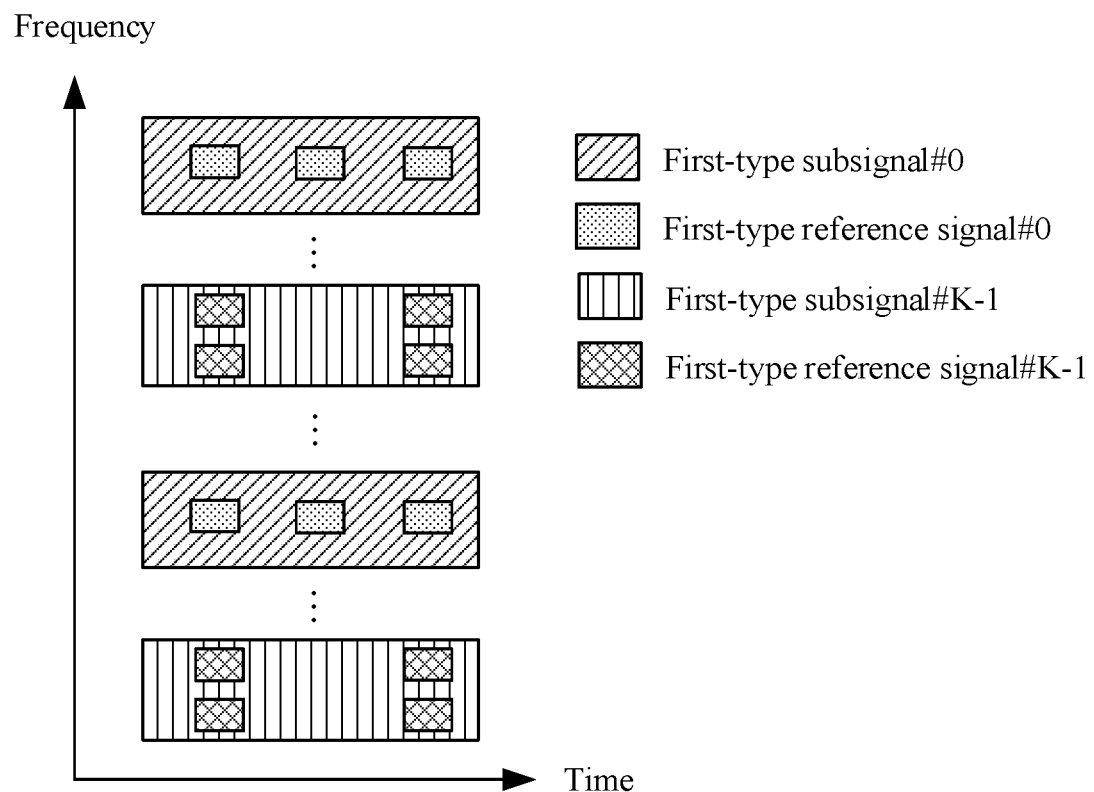
FIG. 8 illustrates a schematic diagram of resources mapping of K first-type sub-signals and K first-type reference signals in time-frequency domain according to one embodiment of the present disclosure.

Embodiment 8 illustrates a schematic diagram of resources mapping of K first-type sub-signals and K first-type reference signals in time-frequency domain according to one embodiment of the present disclosure, as shown in FIG. 8. In FIG. 8, indexes of the K first-type sub-signals and the K first-type reference signals are respectively #0, . . . , #K−1.

In one embodiment, any of the K first-type sub-signals occupies a positive integer number of inconsecutive RBs in frequency domain.

In one embodiment, there at least exists one first-type sub-signal in the K first-type sub-signals that comprises a positive integer number of inconsecutive RBs in frequency domain.

In one embodiment, any of the K first-type sub-signals occupies a positive integer number of inconsecutive PRBs in frequency domain.

In one embodiment, there at least exists one first-type sub-signal in the K first-type sub-signals that comprises a positive integer number of inconsecutive PRBs in frequency domain.

Embodiment 9

Embodiment 9 illustrates a schematic diagram of a first signaling being used for determining time-frequency resources occupied by a first radio signal according to one embodiment of the present disclosure, as shown in FIG. 9.

In one embodiment, the first signaling is a physical-layer signaling.

In one embodiment, the first signaling is a dynamic signaling.

In one embodiment, the first signaling is a layer 1 (L1) signaling.

In one embodiment, the first signaling is a L1 control signaling.

In one embodiment, the first signaling is a dynamic signaling used for UpLink Grant.

In one embodiment, the first signaling is a dynamic signaling used for Downlink Grant.

In one embodiment, the first signaling is a dynamic signaling used for Configured UL grant.

In one embodiment, the first signaling is a dynamic signaling used for Configured UL grant activation.

In one embodiment, the first signaling is a dynamic signaling used for downlink Semi-persistent scheduling (SPS) assignment activation.

In one embodiment, the first signaling comprises Downlink Control Information (DCI).

In one embodiment, the first signaling comprises DCI for UpLink Grant.

In one embodiment, the first signaling comprises DCI for DownLink Grant.

In one embodiment, the first signaling comprises DCI for Configured UL grant.

In one embodiment, the first signaling comprises DCI for Configured UL grant activation.

In one embodiment, the first signaling comprises DCI for Configured UL grant Type 2 activation.

In one embodiment, the first signaling comprises DCI for Downlink SPS allocation activation.

In one embodiment, the first signaling is UE-specific.

In one embodiment, the first signaling comprises DCI identified by Cell Radio Network Temporary Identifier (C-RNTI).

In one embodiment, the first signaling comprises DCI of CRC scrambled by C-RNTI.

In one embodiment, the first signaling comprises DCI identified by Configured Scheduling (CS)-RNTI.

In one embodiment, the first signaling comprises DCI of CRC scrambled by CS-RNTI.

In one embodiment, the first signaling comprises DCI identified by MCS-C-RNTI.

In one embodiment, the first signaling comprises DCI of CRC scrambled by MCS-C-RNTI.

In one embodiment, the first signaling comprises DCI identified by Semi-Persistent Channel-State Information-RNTI (SP-CSI-RNTI).

In one embodiment, the first signaling comprises DCI of CRC scrambled by SP-CSI-RNTI.

In one embodiment, the first signaling is a higher-layer signaling.

In one embodiment, the first signaling is a Radio Resource Control signaling.

In one embodiment, the first signaling is a Medium Access Control layer Control Element (MAC CE) signaling.

In one embodiment, the first signaling indicates time-frequency resources occupied by the first radio signal.

In one embodiment, the first signaling explicitly indicates time-frequency resources occupied by the first radio signal.

In one embodiment, the first signaling comprises scheduling information of the first radio signal.

In one embodiment, scheduling information of the first radio signal comprises one or more of occupied time-domain resources, occupied frequency-domain resources, a scheduled MCS, DMRS configuration information, HARQ process number, RV or New Data Indicator (NDI) of the first radio signal.

In one embodiment, the DMRS configuration information comprises one or more of occupied time domain resources, occupied frequency domain resources, occupied code domain resources, RS sequence, mapping mode, DMRS type, cyclic shift, Orthogonal Cover Code (OCC), $w_f(k')$ or $w_t(l')$ of the DMRS. The $w_f(k')$ and the $w_t(l')$ are respectively spread spectrum sequences in frequency domain and time domain, and the specific meaning of the $w_f(k')$ and the $w_t(l')$ can be found in 3GPP TS38.211, section 6.4.1.

In one embodiment, the first signaling is used for determining K third-type reference signals, and the K third-type reference signals respectively correspond to the K first-type sub-signals.

In one subembodiment of the above embodiment, for any of the K first-type sub-signals, a transmission antenna port of the given first-type sub-signal and a transmission antenna port of its corresponding third-type reference signal are QCL.

In one subembodiment of the above embodiment, for any given first-type sub-signal in the K first-type sub-signals, the UE in the present disclosure uses a same spatial-domain receive filter for receiving the given first-type sub-signal and its corresponding third-type reference signal; the operating action in the present disclosure is receiving.

In one subembodiment of the above embodiment, for any given first-type sub-signal in the K first-type sub-signals, the UE in the present disclosure uses a same spatial-domain transmission filter for transmitting the given first-type sub-signal and its corresponding third-type reference signal; the operating action in the present disclosure is transmitting.

In one subembodiment of the above embodiment, for any given first-type sub-signal in the K first-type sub-signals, the UE in the present disclosure uses a same spatial-domain filter for transmitting the given first-type sub-signal and receiving its corresponding third-type reference signal; the operating action in the present disclosure is transmitting.

In one subembodiment of the above embodiment, for any given first-type sub-signal in the K first-type sub-signals, the UE in the present disclosure uses a same spatial-domain filter for receiving the given first-type sub-signal and transmitting its corresponding third-type reference signal; the operating action in the present disclosure is receiving.

In one subembodiment of the above embodiment, the first signaling comprises a third field, the third field in the first signaling indicates the K third-type reference signals, and the third field in the first signaling comprises all or part of information in a Transmission configuration indication field.

In one subembodiment of the above embodiment, the first signaling comprises a fourth field, the fourth field in the first signaling indicates the K third-type reference signals, and the fourth field in the first signaling comprises all or part of information in an SRS resource indicator field.

In one subembodiment of the above embodiment, the first signaling implicitly indicates the K third-type reference signals.

In one subembodiment of the above embodiment, time-frequency resources occupied by the first signaling is used for determining the K third-type reference signals.

In one subembodiment of the above embodiment, the K third-type reference signals comprise Channel-State Information Reference Signals (CSI-RS).

In one subembodiment of the above embodiment, the K third-type reference signals comprise a Synchronization Signal/Physical Broadcast Channel blocks (SS/PBCH block).

In one subembodiment of the above embodiment, the K third-type reference signals comprise Sounding reference signals (SRS).

In one subembodiment of the above embodiment, the K third-type reference signals are respectively K SRSs, the K SRSs respectively correspond to different ptrs-PortIndexes, and the specific meaning of the ptrs-PortIndex can be found in 3GPP TS38.214 and TS38.331.

In one embodiment, the specific meaning of the Transmission configuration indication field can be found in 3GPP TS38.212.

In one embodiment, the specific meaning of the SRS resource indicator field can be found in 3GPP TS38.212.

In one embodiment, the first signaling indicates the target reference signal port in the present disclosure.

In one embodiment, the first signaling explicitly indicates the target reference signal port in the present disclosure.

In one embodiment, the first signaling implicitly indicates the target reference signal port in the present disclosure.

In one embodiment, the first signaling comprises a first field, the first field of the first signaling indicates the target reference signal port in the present disclosure.

In one embodiment, the first field in the first signaling comprises all or part of information in an Antenna port(s) field.

In one embodiment, the first field in the first signaling comprises all or part of information in an Antenna ports field.

In one embodiment, the specific meaning of the Antenna port(s) can be found in 3GPP TS38.212.

In one embodiment, the specific meaning of the Antenna ports can be found in 3GPP TS38.212.

In one embodiment, a signaling format of the first signaling implicitly indicates the target reference signal port in the present disclosure.

In one embodiment, a signaling format of the first signaling is DCI Format 0_0, and the target reference signal port in the present disclosure is 0.

In one embodiment, a signaling format of the first signaling is DCI Format 1_0, and the target reference signal port in the present disclosure is 1000.

Embodiment 10

Figure 10:
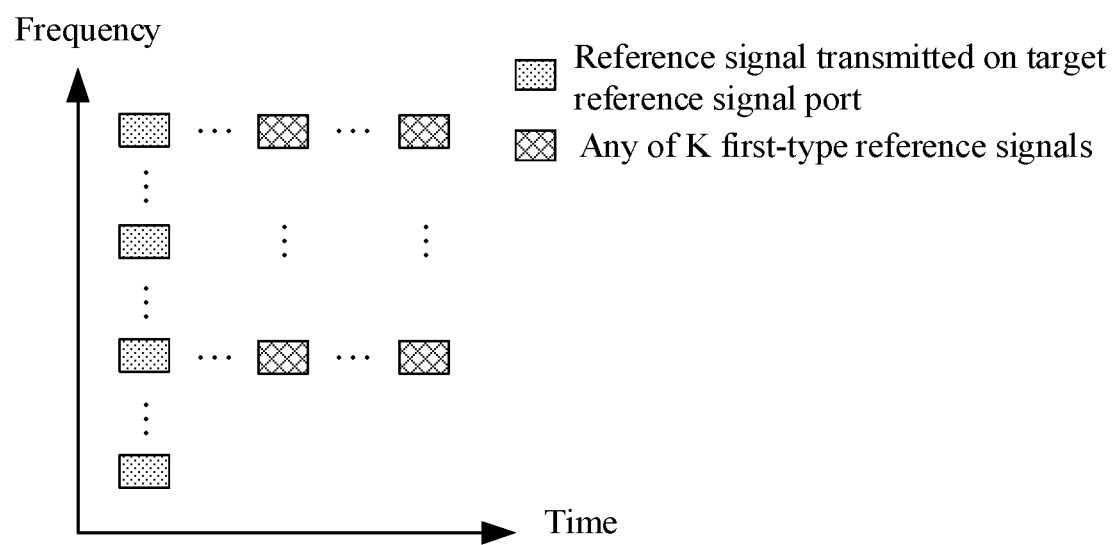
FIG. 10 illustrates a schematic diagram of each of K first-type reference-signal ports being associated with a target reference signal port according to one embodiment of the present disclosure.

Embodiment 10 illustrates a schematic diagram of K first-type reference-signal ports being associated with a target reference signal port according to one embodiment of the present disclosure, as shown in FIG. 10. In Embodiment 10, the K first-type reference signals in the present disclosure are respectively transmitted by the K first-type reference-signal ports.

In one embodiment, the K first-type reference-signal ports are respectively K PTRS ports.

In one embodiment, the specific meaning of the PTRS port can be found in 3GPP TS38.214 (V15.3.0), section 5.1.6.3 and 6.2.3.

In one embodiment, the K is equal to 2, and the K first-type reference signal orts cannot be assumed to be QCL.

In one embodiment, the K is greater than 2, and any two of the K first-type reference-signal ports cannot be assumed to be QCL.

In one embodiment, the target reference signal port is a DMRS port.

In one embodiment, the specific meaning of the DMRS port can be found in 3GPP TS38. 214 and TS38. 212.

In one embodiment, the target reference signal port is a non-negative integer.

In one embodiment, the target reference signal port is a non-negative integer no greater than 11.

In one embodiment, the target reference signal port is a positive integer.

In one embodiment, the target reference signal port is a positive integer no less than 1000 and no greater than 1011.

In one embodiment, any of the K first-type reference-signal port is associated with the target reference signal port.

In one embodiment, the phrase that the K first-type reference-signal ports are associated with a target reference signal port comprises that the target reference signal port is used for determining frequency-domain resources occupied by any of the K first-type reference signals.

In one embodiment, the phrase that the K first-type reference-signal ports are associated with a target reference signal port comprises that the target reference signal port is used for determining subcarriers occupied by any of the K first-type reference signals.

In one embodiment, the specific implementation method that the target reference signal port is used for determining subcarriers occupied by any of the K first-type reference signals can be found in 3GPP TS38.211 (V15.3.0), section 6. 4. 1. 2 and 7. 4. 1. 2.

In one embodiment, the phrase that each of the K first-type reference-signal ports is associated with a target reference signal port comprises that any subcarrier occupied by any of the K first-type reference signals is occupied by a reference signal transmitted on the target reference signal port.

In one embodiment, the phrase that each of the K first-type reference-signal ports is associated with a target reference signal port comprises that the target reference signal port is used for determining time-domain resources occupied by any of the K first-type reference signals.

In one embodiment, the phrase that each of the K first-type reference-signal ports is associated with a target reference signal port comprises that the target reference signal port is used for determining multicarrier symbols occupied by any of the K first-type reference signals.

In one embodiment, the specific implementation method that the target reference signal port is used for determining multicarrier symbols occupied by any of the K first-type reference signals can be found in 3GPP TS38.211 (V15.3.0), section 6. 4. 1. 2 and 7. 4. 1. 2.

In one embodiment, the phrase that each of the K first-type reference-signal ports is associated with a target reference signal port comprises that any multicarrier symbol occupied by any of the K first-type reference signals is not occupied by a reference signal transmitted on the target reference signal port.

In one embodiment, the first signaling in the present disclosure indicates S1 second-type reference signal ports, S1 being a positive integer greater than 1; the target reference signal port is a minimum second-type reference signal port in the S1 second-type reference signal ports.

In one subembodiment of the above embodiment, the S1 second-type reference signal ports are non-negative integers.

In one subembodiment of the above embodiment, the first signaling comprises a first field, the first field in the first signaling indicates the S1 second-type reference signal ports, and the first field in the first signaling comprises all or part of information of an Antenna port(s) field.

In one subembodiment of the above embodiment, the operating action in the present disclosure is receiving, and the performing action in the present disclosure is transmitting.

In one embodiment, the first signaling in the present disclosure indicates S2 second-type reference signal ports, S2 being a positive integer greater than 1; the first signaling comprises a second field, the second field in the first signaling indicates the target reference signal port out of the S2 second-type reference signal ports.

In one subembodiment of the above embodiment, the S2 second-type reference signal ports are non-negative integers.

In one subembodiment of the above embodiment, the second field in the first signaling comprises all or part of information in a PTRS-DMRS association field.

In one subembodiment of the above embodiment, the first signaling comprises a first field, the first field in the first signaling indicates the S2 second-type reference signal ports, and the first field in the first signaling comprises all or part of information of an Antenna ports field.

In one subembodiment of the above embodiment, the operating action in the present disclosure is transmitting, and the performing action in the present disclosure is receiving.

In one embodiment, the specific meaning of the PTRS-DMRS association field can be found in 3GPP TS38.212.

Embodiment 11

Figure 11:
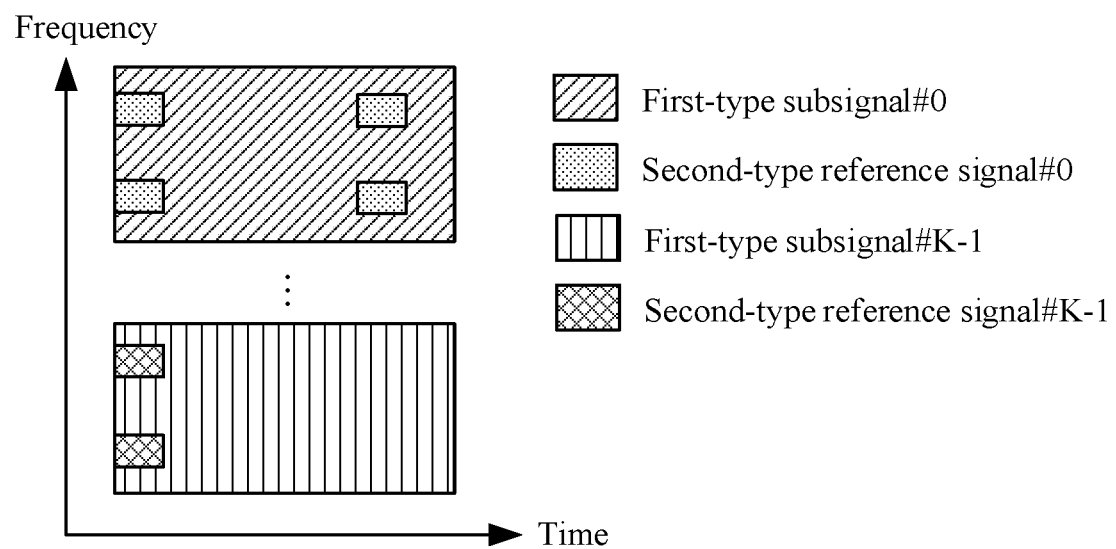
FIG. 11 illustrates a schematic diagram of resources mapping of K second-type reference signals and K first-type sub-signals in time-frequency domain according to one embodiment of the present disclosure.

Embodiment 11 illustrates a schematic diagram of resources mapping of K second-type reference signals and K first-type sub-signals in time-frequency domain according to one embodiment of the present disclosure, as shown in FIG. 11. In Embodiment 11, the K second-type reference signals are respectively used for demodulations of the K first-type sub-signals, and a reference signal port (reference signal ports) of any of the K second-type reference signals comprises (comprise) the target reference signal port in the present disclosure. In FIG. 11, indexes of the K second-type reference signals and the K first-type sub-signals are respectively #0, . . . , #K−1.

In one embodiment, for any given second-type reference signal in the K second-type reference signals, when the given second-type reference signal is transmitted by multiple reference signal ports, the target reference signal port is one of the multiple reference signal ports; when the given second-type reference signal is only transmitted by one reference signal port, the target reference signal port is the one reference signal port.

In one embodiment, the K second-type reference signals comprise DMRSs.

In one embodiment, the K second-type reference signals respectively comprise K DMRSs.

In one embodiment, the K second-type reference signals are respectively K DMRSs.

In one embodiment, any of the K second-type reference signals occupies one multicarrier symbol in time domain.

In one embodiment, at least one of the K second-type reference signals occupies one multicarrier symbol in time domain.

In one embodiment, any of the K second-type reference signals occupies multiple multicarrier symbols in time domain.

In one embodiment, at least one of the K second-type reference signals occupies multiple multicarrier symbols in time domain.

In one embodiment, any of the K second-type reference signals occupies multiple inconsecutive multicarrier symbols in time domain.

In one embodiment, at least one of the K second-type reference signals occupies multiple inconsecutive multicarrier symbols in time domain.

In one embodiment, any of the K second-type reference signals occupies multiple consecutive multicarrier symbols in time domain.

In one embodiment, at least one of the K second-type reference signals occupies multiple consecutive multicarrier symbols in time domain.

In one embodiment, any of the K second-type reference signals occupies a positive integer number of subcarrier(s) in frequency domain.

In one embodiment, any of the K second-type reference signals occupies a positive integer number of inconsecutive subcarriers in frequency domain.

In one embodiment, frequency-domain resources occupied by the K second-type reference signals belong to a same Carrier.

In one embodiment, frequency-domain resources occupied by the K second-type reference signals belong to a BWP.

In one embodiment, REs occupied by any of the K second-type reference signals belong to a time-frequency resource block occupied by its corresponding first-type sub-signal; the time-frequency resource block occupied by the corresponding first-type sub-signal comprises all RBs occupied by the corresponding first-type sub-signals in frequency domain, and all multicarrier symbols occupied by the corresponding first-type sub-signals in time domain.

In one embodiment, a reference signal port (reference signal ports) of any of the K second-type reference signals comprises (comprise) a DMRS port.

In one embodiment, any reference signal port (reference signal ports) of any of the K second-type reference signals is(are) a DMRS port (DMRS ports).

In one embodiment, for any given second-type reference signal in the K second-type reference signals, when the given second-type reference signal is transmitted by P reference signal ports and P is an integer greater than 1, the given second-type reference signal comprises P sub-reference signals, the P sub-reference signals are respectively transmitted by the P reference signal ports, and the P reference signal ports are respectively used for determining time-frequency resources occupied by the P sub-reference signals; when the given second-type reference signal is only transmitted by one reference signal port, the one reference signal port is used for determining time-frequency resources occupied by the given second-type reference signal.

In one subembodiment of the above embodiment, the P reference signal ports are respectively P DMRS ports, and the one reference signal port is one DMRS port.

In one subembodiment of the above embodiment, the P reference signal port are respectively used for determining REs occupied by the P sub-reference signals.

In one subembodiment of the above embodiment, the one reference signal port is used for determining an RE occupied by the given second-type reference signal.

In one embodiment, the phrase that the K second-type reference signals are respectively used for demodulations of the K first-type sub-signals comprises that the K second-type reference signals are respectively used for channel estimation of the K first-type sub-signals.

In one embodiment, the phrase that the K second-type reference signals are respectively used for demodulations of the K first-type sub-signals comprises that a channel that any of the K second-type reference signals goes through can be used by the UE for inferring that a channel that its corresponding first-type sub-signal goes through, the operating action is the present disclosure is receiving, and the performing action in the present disclosure is transmitting.

In one embodiment, the phrase that the K second-type reference signals are respectively used for demodulations of the K first-type sub-signals comprises that a channel that any of the K second-type reference signals goes through can be used by the base station for inferring that a channel that its corresponding first-type sub-signal goes through, the operating action is the present disclosure is transmitting, and the performing action in the present disclosure is receiving.

In one embodiment, the channel comprises one or more of Channel Impulse Response (CIR), a Precoding Matrix Indicator (PMI), a Channel Quality Indicator (CQI), or a Rank Indicator (RI).

In one embodiment, the phrase that the K second-type reference signals are respectively used for demodulations of the K first-type sub-signals comprises that the K second-type reference signals are respectively DMRSs of the K first-type sub-signals.

In one embodiment, the phrase that the K second-type reference signals are respectively used for demodulations of the K first-type sub-signals comprises that the K second-type reference signals are respectively DMRSs carrying PDSCHs of the K first-type sub-signals.

In one embodiment, the phrase that the K second-type reference signals are respectively used for demodulations of the K first-type sub-signals comprises that the K second-type reference signals are respectively DMRSs carrying PUSCHs of the K first-type sub-signals.

Embodiment 12

Figure 12:
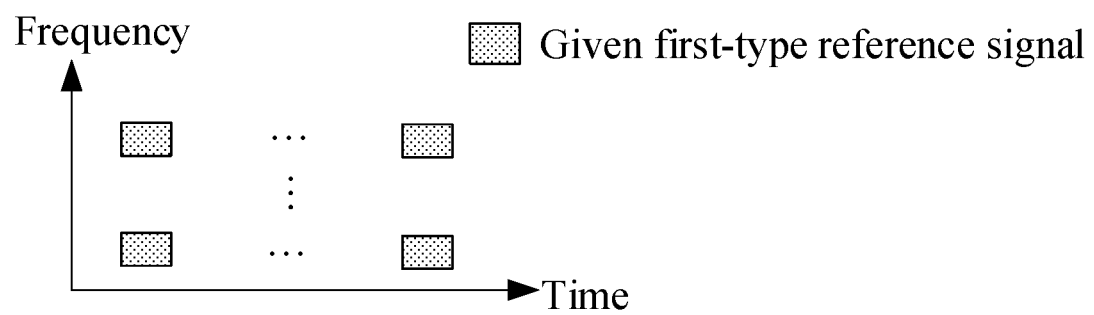
FIG. 12 illustrates a schematic diagram of a time-domain density of a given first-type reference signal according to one embodiment of the present disclosure.

Embodiment 12 illustrates a schematic diagram of a time-domain density of a given first-type reference signal according to one embodiment of the present disclosure, as shown in FIG. 12. In Embodiment 12, the given first-type reference signal is transmitted by a given first-type reference-signal port, and the given first-type reference-signal port is any of the K first-type reference-signal ports in the present disclosure. A pattern of the given first-type reference-signal port comprises the time-domain density of the given first-type reference signal.

In one embodiment, the time-domain density refers to a timeDensity, and the specific meaning of the timeDensity can be found in 3GPP TS38.214 (V15.3.0), section 5. 1. 6. 3, and 6. 2. 3.

In one embodiment, the time-domain density refers to $L_{PT-RS}$, and the specific meaning of $L_{PT-RS}$ can be found in 3GPP TS38.214 (V15.3.0), section 5. 1. 6. 3, and 6. 2. 3., and 3GPP TS38.211 (V15.3.0), section 6. 4. 1. 2, and 7. 4. 1. 2.

In one embodiment, a time-domain density of the given first-type reference signal is related to an MCS scheduled by a given first-type sub-signal; the given first-type sub-signal is one of the K first-type sub-signals in the present disclosure corresponding to the given first-type reference signal.

In one subembodiment of the above embodiment, a scheduled MCS of the given first-type sub-signal is used for determining a time-domain density of the given first-type reference signal.

In one subembodiment of the above embodiment, a time-domain density of the given first-type reference signal is unrelated to a scheduled MCS of any of the K first-type sub-signals other than the given first-type sub-signal.

In one embodiment, a time-domain density of any of the K first-type reference signals is a positive integer.

In one embodiment, a time-domain density of any of the K first-type reference signals is one of 4, 2, or 1.

In one embodiment, a time-domain density of the given first-type reference signal is used for determining multicarrier symbol(s) occupied by the given first-type reference signal.

In one embodiment, a time-domain density of the given first-type reference signal is used for determining a number of multicarrier symbol(s) occupied by the given first-type reference signal.

In one embodiment, a time-domain density of the given first-type reference signal is used for determining a number of multicarrier symbol(s) spaced between two adjacent occurrences of the given first-type reference signal in the time domain.

In one embodiment, a time-domain density of the given first-type reference signal is used for determining a number of multicarrier symbol(s) spaced between any two adjacent multicarrier symbols occupied by the given first-type reference signal in time domain.

In one embodiment, a first symbol and a second symbol are any two adjacent multicarrier symbols occupied by the given first-type reference signal in time domain, and a number of multicarrier symbol(s) between the first symbol and the second symbol is no less than a time-domain density of the given first-type reference signal minus 1.

In one subembodiment of the above embodiment, any multicarrier symbol between the first symbol and the second symbol is not occupied by the given reference signal.

In one subembodiment of the above embodiment, the first symbol is earlier than the second symbol in time domain; a third symbol is a multicarrier symbol located between the first symbol and the second symbol in time domain, and the third symbol is occupied by a reference signal transmitted by the target reference signal port in the present disclosure; a number of multicarrier symbol(s) between the second symbol and the third symbol is no less than a time-domain density of the given first-type reference signal minus 1.

In one embodiment, a given first-type sub-signal is one of the K first-type sub-signals in the present disclosure corresponding to the given first-type reference signal, and a given second-type sub-signal comprises the given first-type sub-signal and the given first-type reference signal. A total of T multicarrier symbol(s) in the given second-type sub-signal is(are) scheduled, T being a positive integer. Index(es) of the T multicarrier symbol(s) from an earliest one is (are sequentially) 0, . . . , T−1.

In one subembodiment of the above embodiment, a time-domain density of the given first-type reference signal is used for determining a number of multicarrier symbol(s) occupied by the given first-type reference signal in the T multicarrier symbol(s).

In one subembodiment of the above embodiment, a time-domain density of the given first-type reference signal is used for determining index(es) of multicarrier symbol(s) occupied by the given first-type reference signal in the T multicarrier symbol(s).

In one subembodiment of the above embodiment, a number and index(es) of multicarrier symbol(s) occupied by a reference signal transmitted on the target reference signal port in the present disclosure in the T multicarrier symbol(s) are used for determining a number and index(es) of multicarrier symbol(s) occupied by the given first-type reference signal in the T multicarrier symbol(s).

Embodiment 13

Figure 13:
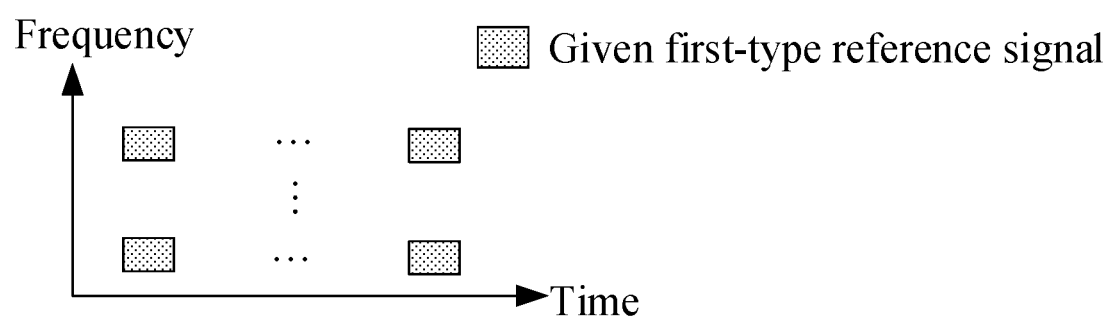
FIG. 13 illustrates a schematic diagram of a frequency-domain density of a given first-type reference signal according to one embodiment of the present disclosure.

Embodiment 13 illustrates a schematic diagram of a frequency-domain density of a given first-type reference signal according to one embodiment of the present disclosure, as shown in FIG. 13. In Embodiment 13, the given first-type reference signal is transmitted by a given first-type reference-signal port, and the given first-type reference-signal port is any of the K first-type reference-signal ports in the present disclosure. A pattern of the given first-type reference-signal port comprises a frequency-domain density of the given first-type reference signal.

In one embodiment, the frequency-domain density refers to a frequencyDensity, and the specific meaning of the frequencyDensity can be found in 3GPP TS38.214 (V15.3.0), section 5. 1. 6. 3, and 6. 2. 3.

In one embodiment, the frequency-domain density refers to $K_{PT-RS}$, and the specific meaning of the $K_{PT-RS}$ can be found in 3GPP TS38.214 (V15.3.0), section 5. 1. 6. 3, and 6. 2. 3, and 3GPP TS38.211 (V15.3.0), section 6. 4. 1. 2, and 7. 4. 1. 2.

In one embodiment, a frequency-domain density of the given first-type reference signal is related to a number of scheduled RB(s) of a given first-type sub-signal; the given first-type sub-signal is one of the K first-type sub-signals in the present disclosure corresponding to the given first-type reference signal.

In one subembodiment of the above embodiment, a number of scheduled RB(s) of the given first-type sub-signal is used for determining a frequency-domain density of the given first-type reference signal.

In one subembodiment of the above embodiment, a frequency-domain density of the given first-type reference signal is unrelated to a number of scheduled RB(s) of any of the K first-type sub-signals other than the given first-type sub-signal.

In one embodiment, a frequency-domain density of any of the K first-type reference signals is a positive integer.

In one embodiment, a frequency-domain density of any of the K first-type reference signals is 4 or 2.

In one embodiment, a frequency-domain density of the given first-type reference signal is used for determining subcarrier(s) occupied by the given first-type reference signal.

In one embodiment, a frequency-domain density of the given first-type reference signal is used for determining a number of subcarrier(s) occupied by the given first-type reference signal.

In one embodiment, a frequency-domain density of the given first-type reference signal is used for determining a number of subcarrier(s) spaced between two adjacent occurrences of the given first-type reference signal in the frequency domain.

In one embodiment, a frequency-domain density of the given first-type reference signal is used for determining a number of subcarrier(s) spaced between any two adjacent subcarriers occupied by the given first-type reference signal in frequency domain.

In one embodiment, a first subcarrier and a second subcarrier are any two adjacent subcarriers occupied by the given first-type reference signal in frequency domain, and a number of subcarrier(s) between the first subcarrier and the second subcarrier is no less than a product of a frequency-domain density of the given first-type reference signal and a first parameter minus 1.

In one subembodiment of the above embodiment, the first parameter is fixed.

In one subembodiment of the above embodiment, the first parameter is fixed at 12.

In one subembodiment of the above embodiment, the first parameter is fixed at $N_{sc}^{RB}$, the $N_{sc}^{RB}$ is a number of subcarrier(s) comprised in an RB, and the specific meaning of the $N_{sc}^{RB}$ can be seen in 3GPP TS28.211.

In one subembodiment of the above embodiment, the first parameter is a number of subcarrier(s) comprised in an RB.

In one subembodiment of the above embodiment, the first parameter is a number of subcarrier(s) comprised in a PRB.

In one subembodiment of the above embodiment, the first parameter is a positive integer.

In one subembodiment of the above embodiment, any subcarrier between the first subcarrier and the second subcarrier is not occupied by the given first-type reference signal.

In one embodiment, a pattern of the given first-type reference-signal port comprises a resource-element offset of the given first-type reference signal.

In one embodiment, the resource-element offset refers to a resourceElementOffset, and the specific meaning of the resourceElementOffset can be found in 3GPP TS38.211 (V15.3.0), section 6. 4. 1. 2 and 7. 4. 1. 2.

In one embodiment, a resource element of any of the K first-type reference signals is one of 00, 01, 10 or 11.

In one embodiment, a resource-element offset of the given first-type reference signal is used for determining subcarrier(s) occupied by the given first-type reference signal.

In one embodiment, a given first-type sub-signal is one of the K first-type sub-signals in the present disclosure corresponding to the given first-type reference signal, and a given second-type sub-signal comprises the given first-type sub-signal and the given first-type reference signal; the given second-type sub-signal occupies a total of $N_{RB}$ RB(s), and the $N_{RB}$ RB(s) comprises (comprise) a total of $N_{sc}^{RB}N_{RB}$ subcarrier(s), the $N_{sc}^{RB}$ is a number of subcarrier(s) comprised in an RB. Index(es) of the $N_{sc}^{RB}N_{RB}$ subcarrier(s) from a minimum frequency is (are sequentially) 0, . . . , $N_{sc}^{RB}N_{RB}-1$.

In one subembodiment of the above embodiment, a resource-element offset of the given first-type reference signal is used for determining index(es) of subcarrier(s) occupied by the given first-type reference signal in the $N_{sc}^{RB}N_{RB}$ subcarrier(s).

In one subembodiment of the above embodiment, a time-domain density of the given first-type reference signal is used for determining a number of subcarrier(s) occupied by the given first-type reference signal in the $N_{sc}^{RB}N_{RB}$ subcarrier(s).

In one subembodiment of the above embodiment, a frequency-domain density of the given first-type reference signal is used for determining index(es) of subcarrier(s) occupied by the given first-type reference signal in the $N_{sc}^{RB}N_{RB}$ subcarrier(s).

In one subembodiment of the above embodiment, a signaling identifier of the first signaling in the present disclosure is used for determining index(es) of subcarrier(s) occupied by the given first-type reference signal in the $N_{sc}^{RB}N_{RB}$ subcarrier(s).

In one embodiment, a signaling identifier of the first signaling in the present disclosure is one of C-RNTI, MCS-C-RNTI, SP-CSI-RNTI, or CS-RNTI.

Embodiment 14

Figure 14:
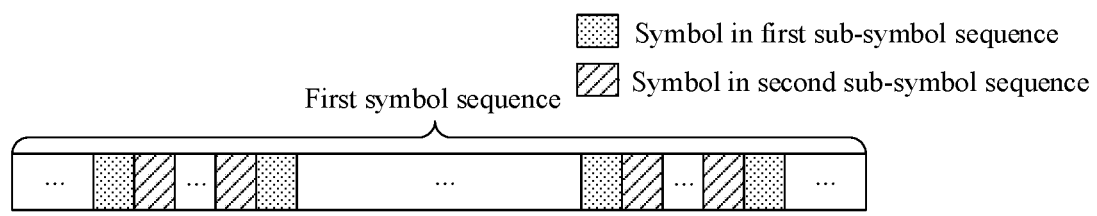
FIG. 14 illustrates a schematic diagram of a sample-density parameter group of a given first-type reference signal according to one embodiment of the present disclosure.

Embodiment 14 illustrates a schematic diagram of a sample-density parameter group of a given first-type reference signal according to one embodiment of the present disclosure, as shown in FIG. 14. In Embodiment 14, the given first-type reference signal is transmitted by a given first-type reference-signal port, and the given first-type reference-signal port is any of the K first-type reference-signal ports in the present disclosure. A pattern of the given first-type reference-signal port comprises a sample-density parameter group of the given first-type reference signal. A given first-type sub-signal is one of the K first-type sub-signals in the present disclosure corresponding to the given first-type reference signal, and a given second-type sub-signal comprises the given first-type sub-signal and the given first-type reference signal. The given second-type sub-signal is an output after a symbol in a first symbol sequence sequentially through transform precoder, Precoding, Resource Element Mapper, Multicarrier Symbol Generation, and Modulation and Upconversion, the first symbol sequence comprises a positive integer number of symbol(s). The first symbol sequence comprises all symbols in a first sub-symbol sequence and all symbols in a second sub-symbol sequence, and the first sub-symbol sequence and the second sub-symbol sequence respectively comprise a positive integer number of symbol(s). The given first-type sub-signal carries a given bit block, and the given bit block is used for generating the first sub-symbol sequence. The second sub-symbol sequence is used for generating the given first-type reference signal, and the second sub-symbol sequence is unrelated to the given bit block. A sample-density parameter group of the given first-type reference signal is used for determining a number of symbol(s) comprised in the second sub-symbol sequence and position(s) of symbol(s) of the second sub-symbol sequence in the first symbol sequence.

In one embodiment, the sample density refers to a sampleDensity, and the specific meaning of the sampleDensity can be found in 3GPP TS38.214 (V15.3.0), section 6. 2. 3.

In one embodiment, the sample-density parameter group comprises Number of PT-RS groups and Number of samples per PT-RS group.

In one embodiment, specific meanings of the Number of PT-RS groups and the Number of samples per PT-RS group can be found in 3GPP TS38.214 (V15.3.0), section 6.2.3.

In one embodiment, the sample-density parameter group comprises $N_{group}^{PT-RS}$ and $N_{sample}^{group}$, the $N_{group}^{PT-RS}$ a number of PT-RS group(s), and the $N_{sample}^{group}$ is a number of sample(s) per PT-RS group; and specific meanings of the $N_{group}^{PT-RS}$ and the $N_{sample}^{group}$ be found in 3GPP TS38. 211.

In one embodiment, a sample-density parameter group of any of the K first-type reference signals comprises Number of PT-RS groups and Number of samples per PT-RS group.

In one embodiment, a sample-density parameter group of the given first-type reference signal comprises Number of PT-RS groups of the given first-type reference signal and Number of samples per PT-RS group of the given first-type reference signal.

In one embodiment, a sample-density parameter group of the given first-type reference signal is related to a number of scheduled RB(s) of the given first-type sub-signal.

In one embodiment, a number of scheduled RB(s) of the given first-type sub-signal is used for determining sample-density parameter group of the given first-type reference signal.

In one embodiment, sample-density parameter group of the given first-type reference signal is unrelated to a number of scheduled RB(s) of any of the K first-type sub-signals other than the given first-type sub-signal.

In one embodiment, Number of PT-RS groups and Number of samples per PT-RS group of any of the K first-type reference signals are respectively positive integers.

In one embodiment, Number of PT-RS groups of any of the K first-type reference signals is one of 2, 4, or 8.

In one embodiment, Number of samples per PT-RS group of any of the K first-type reference signals is 2 or 4.

In one embodiment, the given second-type sub-signal consists of the given first-type sub-signal and the given first-type reference signal.

In one embodiment, the given second-type sub-signal is formed by adding the given first-type sub-signal and the given first-type reference signal.

In one embodiment, the first symbol sequence consists of all symbols in the first sub-sequence and all symbols in the second sub-sequence.

In one embodiment, the first sub-symbol sequence is an output after bits in the given bit block sequentially through CRC Attachment, Segmentation, CB-level CRC Attachment, channel coding, rate matching, Concatenation, Scrambling, Modulation Mapper, and Layer Mapper.

In one embodiment, the given first-type reference signal is an output of all symbols in the second sub-symbol sequence sequentially through transform precoder, Precoding, Resource Element Mapper, Multicarrier Symbol Generation, and Modulation and Upconversion.

In one embodiment, any symbol in the first symbol sequence is a complex symbol.

In one embodiment, any symbol in the first sub-symbol sequence is a complex symbol.

In one embodiment, any symbol in the second sub-symbol sequence is a complex symbol.

In one embodiment, symbols in the second sub-symbol sequence occur multiple times in the first symbol sequence, and each occurrence of symbol(s) in the second sub-symbol sequence in the first symbol sequence comprises a positive integer number of consecutive symbols.

In one embodiment, a number of time(s) that symbol(s) in the second sub-symbol occurs (occur) in the first symbol sequence is equal to a number of PT-RS group(s) of the given first-type reference signal, and a number of symbol(s) comprised in each occurrence of symbol(s) in the second sub-signal sequence in the first symbol sequence is equal to a number of PT-RS group(s) of the given first-type reference signal.

Embodiment 15

Figure 15:
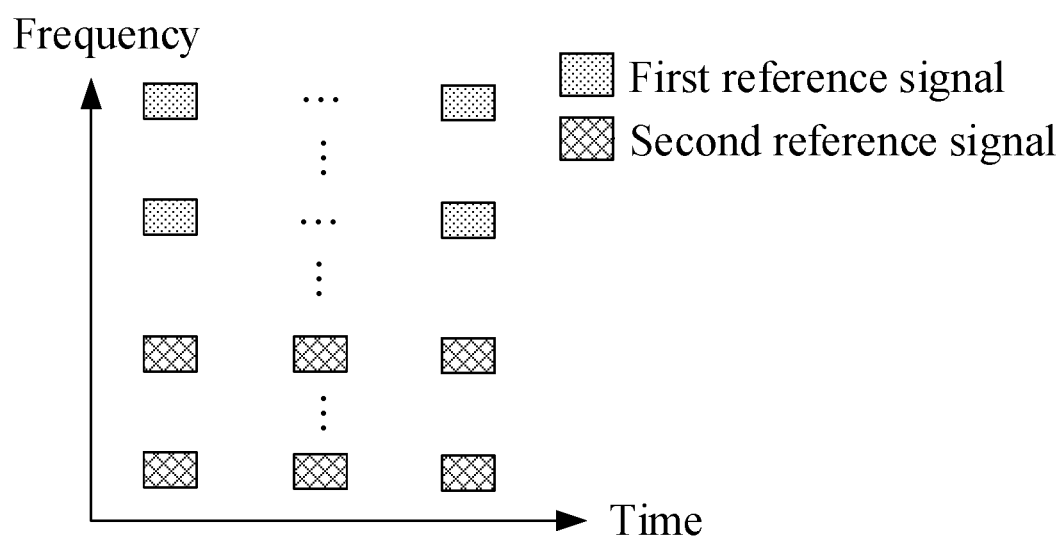
FIG. 15 illustrates a schematic diagram of there existing two of K first-type reference-signal ports that have different patterns according to one embodiment of the present disclosure.

Embodiment 15 illustrates a schematic diagram of there existing two of K first-type reference-signal ports that have different patterns according to one embodiment of the present disclosure, as shown in FIG. 15. In Embodiment 15, a first reference signal port and a second reference signal port are two first-type reference-signal ports in the K first-type reference-signal ports, and a first reference signal and a second reference signal are respectively first-type reference signals in the K first-type reference signals transmitted by the first reference signal port and the second reference signal port. A time-domain density of the first reference signal is different from that of the second reference signal.

In one embodiment, the K is equal to 2, and patterns of the K first-type reference-signal ports are different.

In one embodiment, the K is greater than 2, and patterns of any two of the K first-type reference-signal ports are different.

In one embodiment, the K is greater than 2, and there at least exist two of the K first-type reference-signal ports that have different patterns.

In one embodiment, the pattern refers to a pattern of PTRS; and the specific meaning of the pattern of the PTRS can be found in 3GPP TS38.214 (V15.3.0), section 5.1.6.3 and 6.2.3.

In one embodiment, the pattern refers to a pattern of PTRS port; and the specific meaning of the pattern of the PTRS port can be found in 3GPP TS38.214 (V15.3.0), section 5.1.6.3 and 6.2.3.

In one embodiment, the pattern refers to a pattern of PTRS antenna port; and the specific meaning of the pattern of the PTRS antenna port can be found in 3GPP TS38.214 (V15.3.0), section 5.1.6.3 and 6.2.3.

In one embodiment, the pattern refers to a pattern of PTRS group; and the specific meaning of the pattern of the PTRS group can be found in 3GPP TS38.214 (V15.3.0), section 5.1.6.3 and 6.2.3.

In one embodiment, the K is equal to 2, and time-domain densities of the K first-type reference signal are different.

In one embodiment, the K is greater than 2, and time-domain densities of any two of the K first-type reference-signal ports are different.

In one embodiment, the K is greater than 2, and time-domain densities of at least two of the K first-type reference-signal ports are different.

In one embodiment, there exist two of the K first-type reference signals that comprise unequal numbers of multi-carrier symbols.

In one embodiment, a minimum value of a number of multicarrier symbol(s) spaced between any two adjacent multicarrier symbols occupied by the first reference signal in time domain is unequal to a minimum value of a number of multicarrier symbol(s) spaced between any two adjacent multicarrier symbols occupied by the second reference signal in time domain.

In one embodiment, a first symbol is any multicarrier symbol occupied by the first reference signal in time domain, and a second symbol is any multicarrier symbol occupied by the second reference signal in time domain; a minimum value of a number of multicarrier(s) between the first symbol and a third symbol is unequal to a minimum value of a number of multicarrier symbol(s) between the second symbol and a fourth symbol; the third symbol is any multicarrier symbol that is located before the first symbol and occupied by a reference signal transmitted by the target reference signal port in the present disclosure, and the fourth symbol is any multicarrier symbol that is located before the second symbol in time domain and occupied by a reference signal transmitted by the target reference signal port.

Embodiment 16

Figure 16:
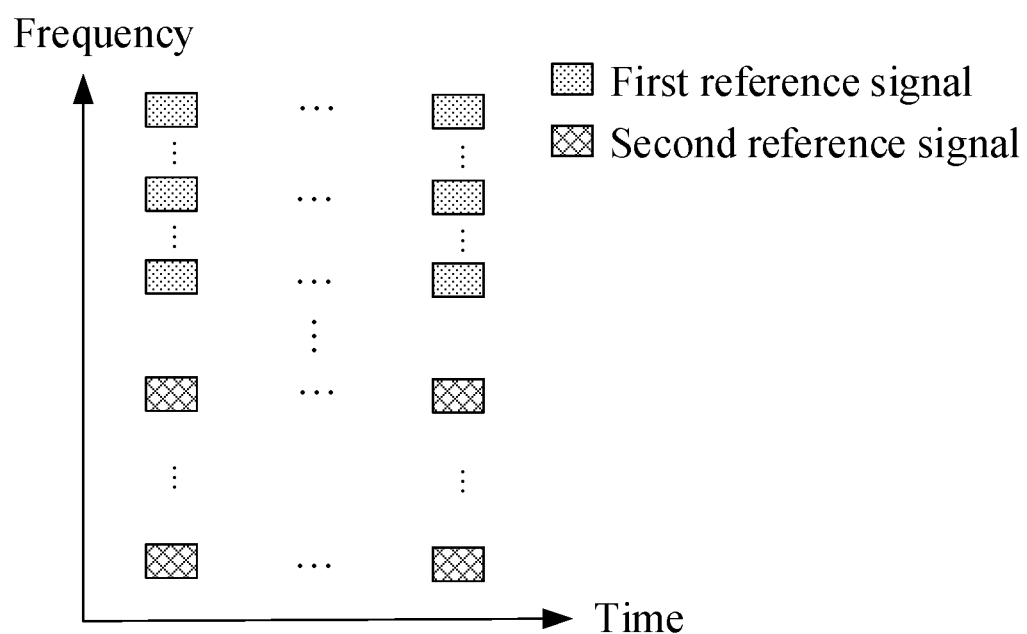
FIG. 16 illustrates a schematic diagram of there existing two of K first-type reference-signal ports that have different patterns according to one embodiment of the present disclosure.

Embodiment 16 illustrates a schematic diagram of there existing two of K first-type reference-signal ports that have different patterns according to one embodiment of the present disclosure, as shown in FIG. 16. In Embodiment 16, a first reference signal port and a second reference signal port are two of the K first-type reference-signal ports, and a first reference signal and a second reference signal are respectively first-type reference signals in the K first-type reference signals transmitted by the first reference signal port and the second reference signal port. A frequency-domain density of the first reference signal is different from that of the second reference signal.

In one embodiment, the K is equal to 2, and frequency-domain densities of the K first-type reference signal are different.

In one embodiment, the K is greater than 2, and frequency-domain densities of any two of the K first-type reference-signal ports are different.

In one embodiment, the K is greater than 2, and frequency-domain densities of at least two of the K first-type reference-signal ports are different.

In one embodiment, the K is equal to 2, and resource-element offsets of the K first-type reference signal are different.

In one embodiment, the K is greater than 2, and resource-element offsets of any two of the K first-type reference-signal ports are different.

In one embodiment, the K is greater than 2, and resource-element offsets of at least two of the K first-type reference-signal ports are different.

In one embodiment, there exist two of the K first-type reference signals that comprise unequal numbers of subcarriers.

In one embodiment, a minimum value of a number of subcarrier(s) occupied by a first-type sub-signal corresponding to the first reference signal between any two adjacent subcarriers occupied by the first reference signal in frequency domain is unequal to a minimum value of a number of subcarrier(s) occupied by a first-type sub-signal corresponding to the second reference signal between any two adjacent subcarriers occupied by the second reference signal in frequency domain.

Embodiment 17

Embodiment 17 illustrates a schematic diagram of there existing two of K first-type reference-signal ports that have different patterns according to one embodiment of the present disclosure, as shown in FIG. 17. In Embodiment 17, a first reference signal port and a second reference signal port are two first-type reference-signal ports in the K first-type reference-signal ports, and a first reference signal and a second reference signal are respectively first-type reference signals in the K first-type reference signals transmitted by the first reference signal port and the second reference signal port. A sample-density parameter group of the first reference signal is different from that of the second reference signal. A sample-density parameter group of the first reference signal comprises a first number of PT-RS groups and a first number of samples per PT-RS group, and a sample-density parameter group of the second reference signal comprises a second number of PT-RS groups and a second number of samples per PT-RS group.

In one embodiment, the first number of PT-RS groups is different from the second number of PT-RS groups.

In one embodiment, the first number of samples per PT-RS group is different from the second number of samples per PT-RS group.

In one embodiment, the first number of PT-RS groups is different from the second number of PT-RS groups, and the first number of samples per PT-RS group is different from the second number of samples per PT-RS group.

In one embodiment, the K is equal to 2, and sample-density parameter groups of the K first-type reference signals are different.

In one embodiment, the K is greater than 2, and sample-density parameter groups of any two of the K first-type reference signals are different.

In one embodiment, the K is greater than 2, and sample-density parameter groups of at least two of the K first-type reference signals are different.

In one embodiment, the K is equal to 2, and numbers of PT-RS groups of the K first-type reference signals are different.

In one embodiment, the K is equal to 2, and numbers of samples per PT-RS group of the K first-type reference signals are different.

In one embodiment, the K is greater than 2, and numbers of PT-RS groups of any two of the K first-type reference signals are different.

In one embodiment, the K is greater than 2, and numbers of samples per PT-RS group of any two of the K first-type reference signals are different.

41

In one embodiment, the K is greater than 2, and numbers of PT-RS groups of at least two of the K first-type reference signals are different.

In one embodiment, the K is greater than 2, and numbers of samples per PT-RS group of at least two of the K first-type reference signals are different.

In one embodiment, there exist numbers of PT-RS groups of two of the K first-type reference signals being different.

In one embodiment, there exist numbers of samples per PT-RS group of two of the K first-type reference signals being different.

In one embodiment, there exist two of the K first-type reference signals that have different numbers of PT-RS groups and different numbers of samples per PT-RS group.

Embodiment 18

Embodiment 18 illustrates a schematic diagram of first information according to one embodiment of the present disclosure, as shown in FIG. 18. In Embodiment 18, the first information comprises only the first sub-information in the first sub-information and the second sub-information in the present disclosure. The first sub-information is used for determining a first MCS threshold set, the first MCS threshold set comprising M1 MCS threshold(s), M1 being a positive integer, and the first MCS threshold set is used for determining a time-domain density of any of the K first-type reference signals in the present disclosure.

In one embodiment, the first information is carried by a higher-layer signaling.

In one embodiment, the first information is carried by an RRC signaling.

In one embodiment, the first information is carried by a MAC CE signaling.

In one embodiment, the first information comprises all or part of information of an Information Element (IE).

In one embodiment, the first information comprises all or part of information of a DMRS-UplinkConfig IE.

In one embodiment, the first information comprises all or part of information of a DMRS-DownlinkConfig IE.

In one embodiment, the first information comprises all or part of information of a PTRS-UplinkConfig IE.

In one embodiment, the first information comprises all or part of information of a PTRS-DownlinkConfig IE.

In one embodiment, the specific meaning of DMRS-UplinkConfig IE can be found in 3GPP TS38.331.

In one embodiment, the specific meaning of DMRS-DownlinkConfig IE can be found in 3GPP TS38.331.

In one embodiment, the specific meaning of PTRS-UplinkConfig IE can be found in 3GPP TS38.331.

In one embodiment, the specific meaning of PTRS-DownlinkConfig IE can be found in 3GPP TS38.331.

In one embodiment, the first information only comprises the first sub-information between the first sub-information and the second sub-information.

In one embodiment, the first information only comprises the first sub-information between the first sub-information and the second sub-information; frequency-domain density of any of the K first-type reference signals is equal to 2.

In one embodiment, the first sub-information indicates the M1 MCS threshold(s).

In one embodiment, the first sub-information explicitly indicates the M1 MCS threshold(s).

In one embodiment, the first sub-information explicitly indicates first M1-1 MCS threshold(s) in the M1 MCS threshold(s).

42

In one embodiment, the first sub-information comprises all or part of information of a timeDensity field of a PTRS-UplinkConfig IE.

In one embodiment, the first sub-information comprises all or part of information of a timeDensity field of a PTRS-DownlinkConfig IE.

In one embodiment, the specific meaning of the timeDensity field can be found in 3GPP TS38.331.

In one embodiment, the first MCS threshold set consists (consist) of M1 MCS threshold(s).

In one embodiment, the M1 is a positive integer greater than 1.

In one embodiment, the M1 is equal to 3.

In one embodiment, the M1 is equal to 4.

In one embodiment, the M1 MCS threshold(s) is (are respectively) ptrs-$MCS_i$ (s), i being any positive integer no greater than the M1; and the specific meaning of the ptrs-$MCS_i$ can be found in 3GPP TS38.214.

In one embodiment, a j-th MCS threshold in the M1 MCS thresholds is no greater than a j+1th MCS threshold in the M1 MCS thresholds, j being any positive integer less than the M1.

In one embodiment, any of the M1 MCS threshold(s) is a non-negative integer no greater than 29.

In one embodiment, a M1-th threshold in the M1 MCS threshold(s) is 28.

In one embodiment, a M1-th threshold in the M1 MCS threshold(s) is 29.

Embodiment 19

Embodiment 19 illustrates a schematic diagram of first information according to one embodiment of the present disclosure, as shown in FIG. 19. In Embodiment 19, the first information comprises only the second sub-information in the first sub-information and the second sub-information in the present disclosure; the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals in the present disclosure.

In one embodiment, the first information only comprises the second sub-information between the first sub-information and the second sub-information.

In one embodiment, the first information only comprises the second sub-information between the first sub-information and the second sub-information; a time-domain density of any of the K first-type reference signals is equal to 1.

In one embodiment, the first information only comprises the second sub-information between the first sub-information and the second sub-information; the first information comprises fifth sub-information, and the fifth sub-information indicates that a time-domain density of any of the K first-type reference signals is equal to 2.

In one subembodiment of the above embodiment, the fifth sub-information comprises all or part of information in a timeDensityTransformPrecoding field in a PTRS-UplinkConfig IE.

In one embodiment, the specific meaning of the timeDensityTransformPrecoding field can be found in 3GPP TS38.331.

In one embodiment, the second sub-information indicates the M2 MCS threshold(s).

In one embodiment, the second sub-information explicitly indicates the M2 MCS threshold(s).

In one embodiment, the second sub-information comprises all or part of information of a frequencyDensity field of a PTRS-UplinkConfig IE.

In one embodiment, the second sub-information comprises all or part of information of a frequencyDensity field of a PTRS-DownlinkConfig IE.

In one embodiment, the second sub-information comprises all or part of information of a sampleDensity field of a PTRS-UplinkConfig IE.

In one embodiment, the specific meaning of the frequencyDensity field can be found in 3GPP TS38.331.

In one embodiment, the specific meaning of the sampleDensity field can be found in 3GPP TS38.331.

In one embodiment, the first bandwidth threshold set consists of the M2 bandwidth threshold(s).

In one embodiment, the first bandwidth threshold set is used for determining a frequency-domain density of any of the K first-type reference signals.

In one embodiment, the M2 is a positive integer greater than 1.

In one embodiment, the M2 is equal to 2.

In one embodiment, the M2 is equal to 3.

In one embodiment, the M2 bandwidth threshold(s) is (are respectively) $N_{RB,i}(s)$, i being any non-negative integer less than the M2; and the specific meaning of the $N_{RB,i}$ can be found in 3GPP TS38.214.

In one embodiment, a j-th bandwidth threshold in the M2 bandwidth thresholds is no greater than a j+1th bandwidth threshold in the M2 bandwidth thresholds, j being any positive integer less than the M2.

In one embodiment, any of the M2 bandwidth threshold is a positive integer.

In one embodiment, any of the M2 bandwidth threshold is a positive integer no greater than 276.

In one embodiment, the first bandwidth threshold set is used for determining a sample-density parameter group of any of the K first-type reference signals.

In one embodiment, the M2 is equal to 5.

Embodiment 20

Embodiment 20 illustrates a schematic diagram of first information according to one embodiment of the present disclosure, as shown in FIG. 20. In Embodiment 20, the first information comprises the first sub-information and the second sub-information in the present disclosure.

In one embodiment, the first information comprises the first sub-information and the second sub-information.

Embodiment 21

Figure 21:
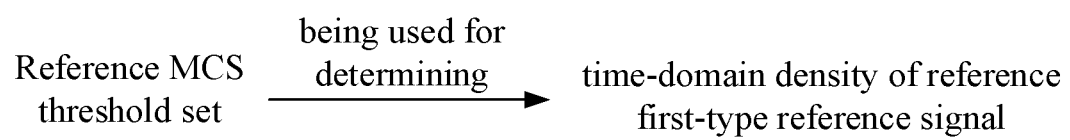
FIG. 21 illustrates a schematic diagram of a given MCS threshold set being used for determining a time-domain density of a given first-type reference signal according to one embodiment of the present disclosure.

Embodiment 21 illustrates a schematic diagram of a reference MCS threshold set being used for determining a time-domain density of a first-type reference signal according to one embodiment of the present disclosure, as shown in FIG. 21. In Embodiment 21, the reference MCS threshold set is the first MCS threshold set in the present disclosure, and the reference first-type reference signal is any of the K first-type reference signals in the present disclosure; or the reference MCS threshold set is any of the L1 MCS threshold set(s) in the present disclosure, and the reference first-type reference signal is one of the K first-type reference signals corresponding to the reference MCS threshold set.

In one embodiment, the reference MCS threshold set is the first MCS threshold set, and the reference first-type reference signal is any of the K first-type reference signals.

In one embodiment, the reference MCS threshold set is any of the L1 MCS threshold set(s), and the reference first-type reference signal is one of the K first-type reference signals corresponding to the reference MCS threshold set.

In one embodiment, any MCS threshold in the first MCS threshold set is an MCS index.

In one embodiment, any MCS threshold in the L1 MCS threshold set(s) is an MCS index.

In one embodiment, the MCS index is $I_{MCS}$, and the specific meaning of the $I_{MCS}$ can be found in 3GPP TS38.214.

In one embodiment, the reference MCS threshold set comprises P0 MCS threshold(s), P0 being a positive integer; the P0 threshold(s) is(are) used for determining P1 MCS index set(s), P1 being a positive integer, and any of the P1 MCS index set(s) comprises a positive integer number of MCS index(es). The P1 MCS index set(s) corresponds (respectively correspond) to P1 time-domain density (densities), and a time-domain density of the reference first-type reference signal is one of the P1 time-domain density (densities)

In one subembodiment of the above embodiment, the reference MCS threshold set is the first MCS threshold set, P0 is equal to the M1 in the present disclosure, and the P0 MCS threshold(s) is(are) the M1 MCS threshold(s) in the present disclosure.

In one subembodiment of the above embodiment, the P1 is equal to 3.

In one subembodiment of the above embodiment, the P1 is equal to the P0.

In one subembodiment of the above embodiment, the P1 is less than the P0.

In one subembodiment of the above embodiment, the P1 is equal to the P0-1.

In one subembodiment of the above embodiment, a scheduled MCS index of a first-type sub-signal corresponding to the reference first-type reference signal belongs to a first MCS index set in the P1 MCS index set(s), and a time-domain density of the reference first-type reference signal is one of the P1 time-domain density (densities) corresponding to the first MCS index set.

In one subembodiment of the above embodiment, the P1 is greater than 1, and there does not exist one MCS index belonging to two of the P1 MCS index set(s) simultaneously.

In one subembodiment of the above embodiment, the P1 time-domain density (densities) is(are) positive integer(s).

In one subembodiment of the above embodiment, the P1 is equal to 3, and the P1 time-domain densities are sequentially 4, 2, and 1.

In one subembodiment of the above embodiment, the specific implementation method that the P0 MCS threshold(s) is(are) used for determining P1 MCS index set(s) can be found in 3GPP TS38.214 (V15.3.0), section 5.1.6.3 and 6.2.3.

In one subembodiment of the above embodiment, the P1 is equal to the P0-1, and any MCS index in an i-th MCS index set in the P1 MCS index set(s) is no less than an i-th MCS threshold in the P0 MCS thresholds and less than an i+1th MCS threshold in the P0 MCS thresholds, i being any positive integer no greater than the P1.

In one subembodiment of the above embodiment, the P1 is equal to the P0-1, and an i-th MCS index set in the P1 MCS index set(s) comprises all MCS indexes no less than an i-th MCS threshold in the P0 MCS thresholds and less than an i+1th MCS threshold in the P0 MCS thresholds; i is any positive integer no greater than the P1.

In one subembodiment of the above embodiment, the P1 is equal to the P0-1, and an i-th MCS index set in the P1 MCS index set(s) consists of all MCS indexes no less than an i-th MCS threshold in the P0 MCS thresholds and less than an i+1th MCS threshold in the P0 MCS thresholds; i is any positive integer no greater than the P1.

Embodiment 22

Embodiment 22 illustrates a schematic diagram of a reference bandwidth threshold set being used for determining a frequency-domain density of a reference first-type reference signal according to one embodiment of the present disclosure, as shown in FIG. 22. In Embodiment 22, the reference bandwidth threshold set is the first bandwidth threshold set in the present disclosure, and the reference first-type reference signal is any of the K first-type reference signals in the present disclosure; or the reference bandwidth threshold set is any of the L2 bandwidth threshold set(s) in the present disclosure, and the reference first-type reference signal is one of the K first-type reference signals corresponding to the reference bandwidth threshold set.

In one embodiment, the reference bandwidth threshold set is the first bandwidth threshold set, and the reference first-type reference signal is any of the K first-type reference signals.

In one embodiment, the reference bandwidth threshold set is any of the L2 bandwidth threshold set(s), and the reference first-type reference signal is one of the K first-type reference signals corresponding to the reference bandwidth threshold set.

In one embodiment, the reference bandwidth threshold set comprises Q0 bandwidth threshold(s), Q0 being a positive integer; the Q0 bandwidth threshold(s) is(are) used for determining Q1 RB number set(s), Q1 being a positive integer, and any of the Q1 RB number set(s) comprises a positive integer number of positive integer(s). The Q1 RB number set(s) corresponds (respectively correspond) to Q1 frequency density (densities), and a frequency-domain density of the reference first-type reference signal is one of the Q1 frequency-domain density (densities).

In one subembodiment of the present disclosure, the reference bandwidth threshold set is the first bandwidth threshold set, Q0 is equal to the M2 in the present disclosure, and the Q0 bandwidth threshold(s) is(are) the M2 bandwidth threshold(s) in the present disclosure.

In one subembodiment of the above embodiment, the Q1 is equal to 2.

In one subembodiment of the above embodiment, the Q1 is equal to the Q0.

In one subembodiment of the above embodiment, the Q1 is less than the Q0.

In one subembodiment of the above embodiment, the Q1 is equal to the Q0-1.

In one subembodiment of the above embodiment, a total number of RB(s) occupied by the reference first-type reference signal belongs to a first RB number set in the Q1 RB number set(s), and a frequency-domain density of the reference first-type reference signal is one of the Q1 frequency-domain density (densities) corresponding to the first RB number set.

In one subembodiment of the above embodiment, Q1 is greater than 1, there does not exist a positive integer belonging to two of the Q1 RB number sets simultaneously.

In one subembodiment of the above embodiment, the Q1 frequency-domain density (densities) is(are) positive integer(s).

In one subembodiment of the above embodiment, Q1 is equal to 2, and the Q1 frequency-domain densities are sequentially 2, and 4.

In one subembodiment of the above embodiment, the specific implementation method that the Q0 bandwidth threshold(s) is(are) used for determining Q1 RB number set(s) can be found in 3GPP TS38.214 (V15.3.0), section 5.1.6.3 and 6.2.3.

In one subembodiment of the above embodiment, Q1 is equal to the Q0, any positive integer in an i-th RB number set in the Q1 RB number sets is no less than an i-th bandwidth threshold in the Q0 bandwidth thresholds and less than an i+1th bandwidth threshold in the Q0 bandwidth thresholds; i is any positive integer less than the Q1. Any positive integer in a Q1-th RB number set in the Q1 RB number sets is no less than a Q0-th bandwidth threshold in the Q0 bandwidth thresholds.

In one subembodiment of the above embodiment, Q1 is equal to the Q0, an i-th RB number set in the Q1 RB number sets comprises all positive integers no less than an i-th bandwidth threshold in the Q0 bandwidth thresholds and less than an i+1th bandwidth threshold in the Q0 bandwidth thresholds; i is any positive integer less than the Q1. A Q1-th RB number set in the Q1 RB number sets comprises all positive integers no less than a Q0-th bandwidth threshold in the Q0 bandwidth thresholds.

In one subembodiment of the above embodiment, Q1 is equal to the Q0, an i-th RB number set in the Q1 RB number sets consists of all positive integers no less than an i-th bandwidth threshold in the Q0 bandwidth thresholds and less than an i+1th bandwidth threshold in the Q0 bandwidth thresholds; i is any positive integer less than the Q1. A Q1-th RB number set in the Q1 RB number sets consists of all positive integers no less than a Q0-th bandwidth threshold in the Q0 bandwidth thresholds.

Embodiment 23

Figure 23:
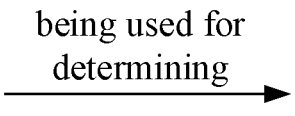
FIG. 23 illustrates a schematic diagram of a given bandwidth threshold set being used for determining a sample-density parameter group of a given first-type reference signal according to one embodiment of the present disclosure.

Embodiment 23 illustrates a schematic diagram of a reference bandwidth threshold set being used for determining a sample-density parameter group of a reference first-type reference signal according to one embodiment of the present disclosure, as shown in FIG. 23. In Embodiment 23, the reference bandwidth threshold set is the first bandwidth threshold set in the present disclosure, and the reference first-type reference signal is any of the K first-type reference signals in the present disclosure; or the reference bandwidth threshold set is any of the L2 bandwidth threshold set(s) in the present disclosure, and the reference first-type reference signal is one of the K first-type reference signals corresponding to the reference bandwidth threshold set.

In one embodiment, the reference bandwidth threshold set comprises Q0 bandwidth threshold(s), Q0 being a positive integer; the Q0 bandwidth threshold(s) is(are) used for determining Q1 RB number set(s), Q1 being a positive integer, and any of the Q1 RB number set(s) comprises a positive integer number of positive integer(s). The Q1 RB number set(s) corresponds (respectively correspond) to Q1 sample-density parameter group(s), and any of the Q1 sample-density parameter group(s) comprises a Number of PT-RS groups and a Number of samples per PT-RS group. A sample-density parameter group of the reference first-type reference signal is one of the Q1 sample-density parameter group(s).

In one subembodiment of the above embodiment, the Q1 is equal to 5.

47

In one subembodiment of the above embodiment, the Q1 is equal to the Q0.

In one subembodiment of the above embodiment, a total number of RB(s) occupied by the reference first-type reference signal belongs to a second RB number set in the Q1 RB number set(s), and a sample-density parameter group of the reference first-type reference signal is one of the Q1 sample-density parameter group(s) corresponding to the second RB number set.

In one subembodiment, number(s) of PT-RS groups in the Q1 sample-density parameter group(s) is(are) positive integers, and number(s) of samples per PT-RS group of the Q1 sample-density parameter group(s) is(are) positive integer(s).

In one subembodiment of the above embodiment, the Q1 is equal to 5, and numbers of PT-RS groups of the Q1 sample-density parameter groups are sequentially 2, 2, 4, 4, and 8, and numbers of samples per PT-RS group of the Q1 sample-density parameter groups are sequentially 2, 4, 2, 4, 4.

In one subembodiment of the above embodiment, the specific implementation method that the Q0 bandwidth threshold(s) is(are) used for determining Q1 RB number set(s) can be found in 3GPP TS38.214 (V15.3.0), section 6.2.3.

Embodiment 24

Embodiment 24 illustrates a schematic diagram of a second information set according to one embodiment of the present disclosure, as shown in FIG. 24. In Embodiment 24, the second information set comprises the K1 piece(s) of second information in the present disclosure; the K1 piece(s) of second information corresponds (respectively correspond) to K1 first-type reference signal(s) in the K first-type reference signals in the present disclosure.

In one embodiment, the K1 is less than the K.

In one embodiment, the K1 is equal to the K.

In one embodiment, the K1 piece(s) of second information is (are respectively) carried by higher layer signaling(s).

In one embodiment, the K1 piece(s) of second information is (are respectively) carried by RRC signaling(s).

In one embodiment, the K1 piece(s) of second information is (are respectively) carried by MAC CE signaling(s).

In one embodiment, the K1 piece(s) of second information is (are respectively) carried by a same RRC signaling.

In one embodiment, at least two of the K1 piece(s) of second information are carried by different RRC signalings.

In one embodiment, the K1 piece(s) of second information is (are respectively) carried by K RRC signalings.

In one embodiment, the K1 piece(s) of second information comprises (comprise) all or part information of an IE.

In one embodiment, the K1 piece(s) of second information comprises (comprise) all or part information of multiple IEs.

In one embodiment, the K1 piece(s) of second information comprises (respectively comprise) all or part information of K IEs.

In one embodiment, any of the K1 piece(s) of second information comprises all or part of information of a DMRS-UplinkConfig IE.

In one embodiment, any of the K1 piece(s) of second information comprises all or part of information of a DMRS-DownlinkConfig IE.

In one embodiment, any of the K1 piece(s) of second information comprises all or part of information of a PTRS-UplinkConfig IE.

48

In one embodiment, any of the K1 piece(s) of second information comprises all or part of information of a PTRS-DownlinkConfig IE.

Embodiment 25

Figure 25:
FIG. 25 illustrates a schematic diagram of relations among K1 piece(s) of second information, L1 piece(s) of second information and L2 piece(s) of second information according to one embodiment of the present disclosure.
Figure 25:
Figure 25:
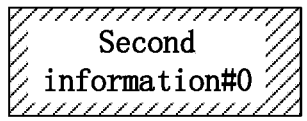
Figure 25:
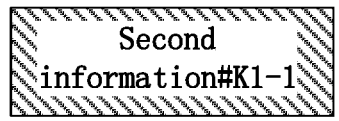

Embodiment 25 illustrates a schematic diagram of relations among K1 piece(s) of second information, L1 piece(s) of second information and L2 piece(s) of second information according to one embodiment of the present disclosure, as shown in FIG. 25. In Embodiment 25, the K1 piece(s) of second information corresponds (respectively correspond) to K1 first-type reference signal(s) in the K first-type reference signals in the present disclosure. L1 piece(s) of second information in the K1 piece(s) of second information comprises (respectively comprise) the L1 piece(s) of third sub-information in the present disclosure, L2 piece(s) of second information in the K1 piece(s) of second information comprises (respectively comprise) the L2 piece(s) of fourth sub-information in the present disclosure. The L1 piece(s) of third sub-information is (are respectively) used for determining the L1 MCS threshold set(s) in the present disclosure, and the L2 piece(s) of fourth sub-information is (are respectively) used for determining the L2 bandwidth threshold set(s) in the present disclosure. In FIG. 25, the K1 piece(s) of second information is (are respectively) #0, . . . , #K1−1.

In one embodiment, the L1 is equal to 0.

In one embodiment, the L1 is greater than 0.

In one embodiment, the L1 is less than the K1.

In one embodiment, the L1 is equal to the K1.

In one embodiment, the L2 is equal to 0.

In one embodiment, the L2 is greater than 0.

In one embodiment, the L2 is less than the K1.

In one embodiment, the L2 is equal to the K1.

In one embodiment, the L1 is equal to the L2, and the L1 piece(s) of second information is(are) the L2 piece(s) of second information.

In one embodiment, an intersection of the L1 piece(s) of second information and the L2 piece(s) of second information is not empty.

In one embodiment, there exists one of the L1 piece(s) of second information that belongs to the L2 piece(s) of second information.

In one embodiment, there exists one of the L1 piece(s) of second information that does not belong to the L2 piece(s) of second information.

In one embodiment, there exists one of the L2 piece(s) of second information that does not belong to the L1 piece(s) of second information.

In one embodiment, there exists one of the K1 piece(s) of second information that belongs to the L1 piece(s) of second information and the L2 piece(s) of second information simultaneously.

In one embodiment, there exists one of the K1 piece(s) of second information that only belongs to the L1 piece(s) of second information in the L1 piece(s) of second information and the L2 piece(s) of second information.

In one embodiment, there exists given second information of the K1 piece(s) of second information that only belongs to the L1 piece(s) of second information in the L1 piece(s) of second information and the L2 piece(s) of second information; and a frequency-domain density of a first-type reference signal corresponding to the given second information is equal to 2.

In one embodiment, there exists one of the K1 piece(s) of second information that only belongs to the L2 piece(s) of second information in the L1 piece(s) of second information and the L2 piece(s) of second information.

In one embodiment, there exists given second information of the K1 piece(s) of second information that only belongs to the L2 piece(s) of second information in the L1 piece(s) of second information and the L2 piece(s) of second information; and a time-domain density of a first-type reference signal corresponding to the given second information is equal to 1.

In one embodiment, there exists given second information of the K1 piece(s) of second information that only belongs to the L2 piece(s) of second information in the L1 piece(s) of second information and the L2 piece(s) of second information; the given second information comprises sixth sub-information, and the sixth sub-information indicates that a time-domain density of a first-type reference signal corresponding to the given second information is equal to 2.

In one embodiment, the K1 is less than the K, and a time-domain density of any of the K first-type reference signals not belonging to the K1 first-type reference signal(s) is equal to 1, and a frequency-domain density is equal to 2.

In one embodiment, the L1 piece(s) of third sub-information indicates (respectively indicate) the L1 MCS threshold set(s).

In one embodiment, the L1 piece(s) of third sub-information explicitly indicates (and respectively indicate) the L1 MCS threshold set(s).

In one embodiment, the L1 piece(s) of third sub-information explicitly indicates (and respectively indicate) all MCS threshold(s) other than a last MCS threshold in its corresponding MCS threshold set.

In one embodiment, any of the L1 piece(s) of third sub-information comprises all or part of information of a timeDensity field of a PTRS-UplinkConfig IE.

In one embodiment, any of the L1 piece(s) of third sub-information comprises all or part of information of a timeDensity field of a PTRS-DownlinkConfig IE.

In one embodiment, a number of MCS thresholds comprised in any of the L1 MCS threshold set(s) is a positive integer greater than 1.

In one embodiment, a number of MCS thresholds comprised in at least one of the L1 MCS threshold set(s) is equal to 3.

In one embodiment, a number of MCS thresholds comprised in at least one of the L1 MCS threshold set(s) is equal to 4.

In one embodiment, any MCS threshold comprised in any of the L1 MCS threshold set(s) is ptrs-$MCS_i$; and the specific meaning of the ptrs-$MCS_i$ can be found in 3GPP TS38.214.

In one embodiment, for any given MCS threshold set in the L1 MCS threshold set(s), a j-th MCS threshold in the given MCS threshold set is no greater than a j+1-th MCS threshold in the given MCS threshold set, and j is any positive integer less than a number of MCS thresholds comprised in the given MCS threshold set.

In one embodiment, any MCS threshold in the L1 MCS threshold set(s) is a non-negative integer no greater than 29.

In one embodiment, a last MCS threshold in any of the L1 MCS threshold set(s) is 28.

In one embodiment, a last MCS threshold in any of the L1 MCS threshold set(s) is 29.

In one embodiment, the L2 piece(s) of fourth sub-information indicates (respectively indicate) the L2 bandwidth threshold set(s).

In one embodiment, the L2 piece(s) of fourth sub-information explicitly indicates (and respectively indicate) the L2 bandwidth threshold set(s).

In one embodiment, any of the L2 piece(s) of fourth sub-information comprises all or part of information of a frequencyDensity field of a PTRS-UplinkConfig IE.

In one embodiment, any of the L2 piece(s) of fourth sub-information comprises all or part of information of a frequencyDensity field of a PTRS-DownlinkConfig IE.

In one embodiment, any of the L2 piece(s) of fourth sub-information comprises all or part of information of a sampleDensity field of a PTRS-UplinkConfig IE.

In one embodiment, the L2 bandwidth threshold set(s) is (are respectively) used for determining frequency-domain density (densities) of the L2 first-type reference signal(s).

In one embodiment, a number of bandwidth thresholds comprised in any of the L2 bandwidth threshold set(s) is a positive integer greater than 1.

In one embodiment, a number of bandwidth thresholds comprised in at least one of the L2 bandwidth threshold set(s) is equal to 2.

In one embodiment, a number of bandwidth thresholds comprised in at least one of the L2 bandwidth threshold set(s) is equal to 3.

In one embodiment, any bandwidth threshold comprised in any of the L2 bandwidth threshold set(s) is $N_{RB,i}$; and the specific meaning of the $N_{RB,i}$ can be found in 3GPP TS38.214.

In one embodiment, for any of the L2 bandwidth threshold set(s), a j-th bandwidth threshold in the given bandwidth threshold set is no greater than a j+1-th bandwidth threshold in the given bandwidth threshold set, and j is any positive integer less than a number of bandwidth thresholds comprised in the given bandwidth threshold set.

In one embodiment, any bandwidth threshold of the L2 bandwidth threshold set(s) is a positive integer.

In one embodiment, any bandwidth threshold of the L2 bandwidth threshold set(s) is a positive integer no greater than 276.

In one embodiment, the L2 bandwidth threshold set(s) is (are respectively) used for determining sample-density parameter group(s) of the L2 first-type reference signal(s).

In one embodiment, a number of bandwidth thresholds comprised in any of the L2 bandwidth threshold set(s) is equal to 5.

In one embodiment, a number of bandwidth thresholds comprised in at least one of the L2 bandwidth threshold set(s) is equal to 5.

In one embodiment, there exist two MCS threshold sets in the L1 MCS threshold sets being different.

In one embodiment, there exist a second MCS threshold set and a third MCS threshold set in the L1 MCS threshold sets, and at least one MCS threshold in the second MCS threshold set does not belong to the third MCS threshold set.

In one embodiment, there exist two bandwidth threshold sets in the L2 bandwidth threshold sets being different.

In one embodiment, there exist a second bandwidth threshold set and a third bandwidth threshold set in the L2 bandwidth threshold sets, and at least one bandwidth threshold in the second bandwidth threshold set does not belong to the third bandwidth threshold set.

Embodiment 26

Figure 26:
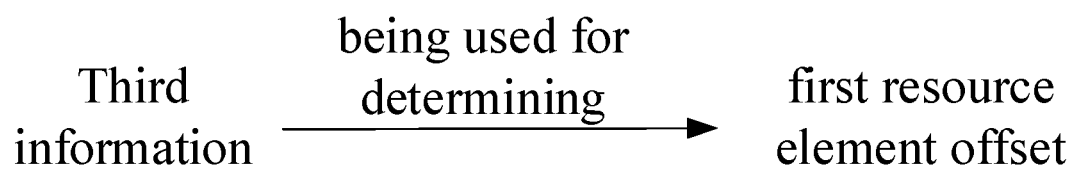
FIG. 26 illustrates a schematic diagram of third information being used for determining a first resource-element offset according to one embodiment of the present disclosure.

Embodiment 26 illustrates a schematic diagram of third information being used for determining a first resource-element offset according to one embodiment of the present disclosure, as shown in FIG. 26. In Embodiment 26, a resource-element offset of any of the K first-type reference signals in the present disclosure is the first resource-element offset.

In one embodiment, the third information is carried by a higher-layer signaling.

In one embodiment, the third information is carried by an RRC signaling.

In one embodiment, the third information is carried by a MAC CE signaling.

In one embodiment, the third information comprises all or part information of an IE.

In one embodiment, the third information comprises all or part of information in a resourceElementOffset field in a PTRS-UplinkConfig IE.

In one embodiment, the third information comprises all or part of information in a resourceElementOffset field in a PTRS-DownlinkConfig IE.

In one embodiment, the specific meaning of the resourceElementOffset field can be found in 3GPP TS38.331.

In one embodiment, the third information indicates the first resource-element offset.

In one embodiment, the third information explicitly indicates the first resource-element offset.

In one embodiment, the first resource-element offset of is one of 00, 01, 10 or 11.

In one embodiment, the third information and the first information in the present disclosure are carried by a same RRC signaling.

Embodiment 27

Embodiment 27 illustrates a schematic diagram of a fourth information set according to one embodiment of the present disclosure, as shown in FIG. 27. In Embodiment 27, the fourth information set comprises the K2 piece(s) of fourth information in the present disclosure; the K2 piece(s) of fourth information corresponds (respectively correspond) to K2 first-type reference signal(s) in the K first-type reference signals; the K2 piece(s) of fourth information is (are respectively) used for determining K2 resource-element offset(s) in the present disclosure, and resource-element offset(s) of the K2 first-type reference signal(s) is (are respectively) the K2 resource-element offset(s).

In one embodiment, the K2 is equal to the K.

In one embodiment, the K2 is less than the K.

In one embodiment, the K2 is less than the K, and a resource-element offset of any of the K first-type reference signals not belonging to the K2 first-type reference signal(s) is 00.

In one embodiment, the K2 piece(s) of fourth information is (are respectively) carried by higher layer signaling(s).

In one embodiment, the K2 piece(s) of fourth information is (are respectively) carried by RRC signaling(s).

In one embodiment, the K2 piece(s) of fourth information is (are respectively) carried by MAC CE signaling(s).

In one embodiment, the K2 piece(s) of fourth information is (are respectively) carried by a same RRC signaling.

In one embodiment, at least two of the K2 piece(s) of fourth information are carried by different RRC signalings.

In one embodiment, the K2 piece(s) of fourth information is (are respectively) carried by K RRC signalings.

In one embodiment, the K2 piece(s) of fourth information comprises (comprise) all or part information of an IE.

In one embodiment, the K2 piece(s) of fourth information comprises (comprise) all or part information of multiple IEs.

In one embodiment, the K2 piece(s) of fourth information comprises (respectively comprise) all or part information of K IEs.

In one embodiment, any of the K2 piece(s) of fourth information comprises all or part of information in a resourceElementOffset field in a PTRS-UplinkConfig IE.

In one embodiment, any of the K2 piece(s) of fourth information comprises all or part of information in a resourceElementOffset field in a PTRS-DownlinkConfig IE.

In one embodiment, the K2 piece(s) of fourth information indicates (respectively indicate) the K2 resource-element offset(s).

In one embodiment, the K2 piece(s) of fourth information explicitly indicates (and respectively indicate) the K2 resource-element offset(s).

In one embodiment, any of the K2 resource-element offset(s) of is one of 00, 01, 10 or 11.

In one embodiment, there exist two different resource-element offsets in the K2 resource-element offsets.

In one embodiment, given fourth information in the K2 piece(s) of fourth information and given second information in the K1 piece(s) of second information in the present disclosure correspond to a same first-type reference signal in the K first-type reference signals, and the given fourth information and the given second information are carried by a same RRC signaling.

Embodiment 28

Figure 28:
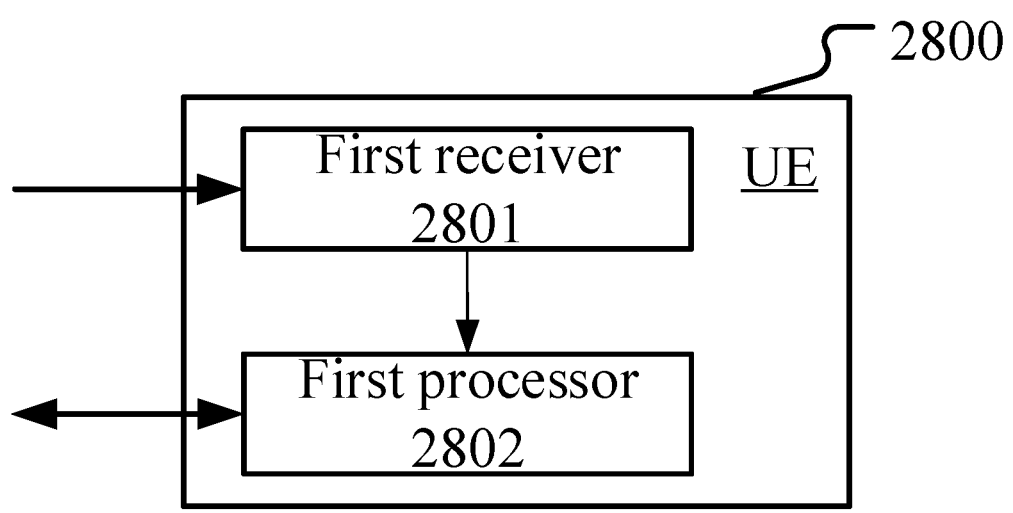
FIG. 28 illustrates a structure block diagram of a processing device in a UE according to one embodiment of the present disclosure.

Embodiment 28 illustrates a structure block diagram of a processing device in a UE according to one embodiment of the present disclosure, as shown in FIG. 28. In FIG. 28, a processing device 2800 in the UE comprises a first receiver 2801 and a first processor 2802.

In Embodiment 28, a first receiver 2801 receives a first signaling; a first processor 2802 operates a first radio signal.

In Embodiment 28, the first radio signal comprises K first-type sub-signals and K first-type reference signals, K being a positive integer greater than 1; the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; the operating action is transmitting, or the operating action is receiving.

In one embodiment, the first processor 2802 transmits the first radio signal.

In one embodiment, the first processor 2802 receives the first radio signal.

In one embodiment, the first radio signal comprises K second-type reference signals; the K second-type reference signals are respectively used for demodulations of the K first-type sub-signals, and a reference signal port (reference signal ports) of any of the K second-type reference signals comprises (comprise) the target reference signal port.

In one embodiment, a pattern of a given first-type reference-signal port comprises one or more of a time-domain density, a frequency-domain density, a sample-density parameter group or a resource-element offset of a given first-type reference signal; the given first-type reference-signal port is any of the K first-type reference-signal ports, and the given first-type reference signal is one of the K first-type reference signals transmitted by the given first-type reference-signal port.

In one embodiment, the first receiver 2801 receives first information; herein, the first information comprises first sub-information; the first sub-information is used for determining a first MCS threshold set, the first MCS threshold set comprising M1 MCS threshold(s), M1 being a positive integer, and the first MCS threshold set is used for determining a time-domain density of any of the K first-type reference signals.

In one embodiment, the first receiver 2801 receives first information; herein, the first information comprises second sub-information; the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals.

In one embodiment, the first receiver 2801 receives first information; herein, the first information comprises first sub-information and second sub-information; the first sub-information is used for determining a first MCS threshold set, the first MCS threshold set comprising M1 MCS threshold(s), M1 being a positive integer, and the first MCS threshold set is used for determining a time-domain density of any of the K first-type reference signals; the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals.

In one embodiment, the first receiver 2801 receives a second information set; herein, the second information set comprises K1 piece(s) of second information, K1 being a positive integer no greater than the K; the K1 piece(s) of second information corresponds (respectively correspond) to K1 first-type reference signal(s) in the K first-type reference signals. L1 piece(s) of second information in the K1 piece(s) of second information comprises (respectively comprise) L1 piece(s) of third sub-information, L2 piece(s) of second information in the K1 piece(s) of second information comprises (respectively comprise) L2 piece(s) of fourth sub-information, L1 and L2 being non-negative integers no greater than the K1. The L1 piece(s) of third sub-information is (are respectively) used for determining L1 MCS threshold set(s), and any of the L1 MCS threshold set(s) comprises a positive integer number of MCS threshold(s); the L1 MCS threshold set(s) is (are respectively) used for determining time-domain density (densities) of L1 first-type reference signal(s), and the L1 first-type reference signal(s) is (are respectively) first-type reference signal(s) in the K first-type reference signals corresponding to the L1 piece(s) of second information; the L2 piece(s) of fourth sub-information is (are respectively) used for determining L2 bandwidth threshold set(s), and any of the L2 bandwidth threshold set(s) comprises a positive integer number of bandwidth threshold(s); the L2 bandwidth threshold set(s) is (are respectively) used for determining frequency-domain density (densities) or sample-density parameter group(s) of L2 first-type reference signal(s), and the L2 first-type reference signal(s) is (are respectively) first-type reference signal(s) in the K first-type reference signals corresponding to the L2 piece(s) of second information.

In one embodiment, the first receiver 2801 receives third information; herein, the third information is used for determining a first resource-element offset, and a resource-element offset of any of the K first-type reference signals is the first resource-element offset.

In one embodiment, the first receiver 2801 receives a fourth information set; herein, the fourth information set comprises K2 piece(s) of fourth information, K2 being a positive integer no greater than the K; the K2 piece(s) of fourth information corresponds (respectively correspond) to K2 first-type reference signal(s) in the K first-type reference signals; the K2 piece(s) of fourth information is (are respectively) used for determining K2 resource-element offset(s), and resource-element offset(s) of the K2 first-type reference signal(s) is (are respectively) the K2 resource-element offset(s).

In one embodiment, the first receiver 2801 comprises at least one of the antenna 452, the receiver 454, the receiving processor 456, the multi-antenna receiving processor 458, the controller/processor 459, the memory 460, or the data source 467 in Embodiment 4.

In one embodiment, the first processor 2802 comprises at least one of the antenna 452, the transmitter 454, the transmitting processor 468, the multi-antenna transmitting processor 457, the controller/processor 459, the memory 460, or the data source 467 in Embodiment 4, the operating action is transmitting.

In one embodiment, the first processor 2802 comprises at least one of the antenna 452, the receiver 454, the receiving processor 456, the multi-antenna receiving processor 458, the controller/receiver 459, the memory 460, or the data source in Embodiment 4, the operating action is receiving.

Embodiment 29

Figure 29:
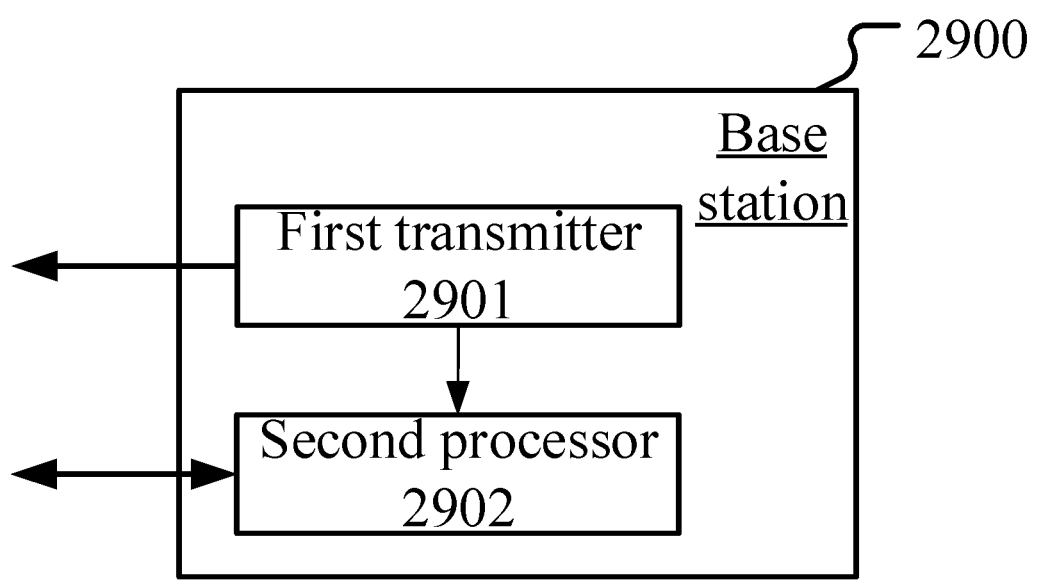
FIG. 29 illustrates a structure block diagram of a processing device in a base station according to one embodiment of the present disclosure.

Embodiment 29 illustrates a structure block diagram of a processing device in a base station according to one embodiment of the present disclosure, as shown in FIG. 29. In FIG. 29, a processing device 2900 in the base station comprises a first transmitter 2901 and a second processor 2902.

In Embodiment 29, a first transmitter 2901 transmits a first signaling; a second processor 2902 performs a first radio signal.

In Embodiment 29, the first radio signal comprises K first-type sub-signals and K first-type reference signals, K being a positive integer greater than 1; the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; the performing action is receiving, or, the performing action is transmitting.

In one embodiment, the second processor 2902 receives the first radio signal.

In one embodiment, the second processor 2902 transmits the first radio signal.

In one embodiment, the first radio signal comprises K second-type reference signals; the K second-type reference signals are respectively used for demodulations of the K first-type sub-signals, and a reference signal port (reference signal ports) of any of the K second-type reference signals comprises (comprise) the target reference signal port.

In one embodiment, a pattern of a given first-type reference-signal port comprises one or more of a time-domain density, a frequency-domain density, a sample-density parameter group or a resource-element offset of a given first-type reference signal; the given first-type reference-signal port is any of the K first-type reference-signal ports, and the given first-type reference signal is one of the K first-type reference signals transmitted by the given first-type reference-signal port.

In one embodiment, the first transmitter 2901 transmits first information; herein, the first information comprises first sub-information; the first sub-information is used for determining a first MCS threshold set, the first MCS threshold set comprising M1 MCS threshold(s), M1 being a positive integer, and the first MCS threshold set is used for determining a time-domain density of any of the K first-type reference signals.

In one embodiment, the first transmitter 2901 transmits first information; herein, the first information comprises second sub-information; the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals.

In one embodiment, the first transmitter 2901 transmits first information; herein, the first information comprises first sub-information and second sub-information; the first sub-information is used for determining a first MCS threshold set, the first MCS threshold set comprising M1 MCS threshold(s), M1 being a positive integer, and the first MCS threshold set is used for determining a time-domain density of any of the K first-type reference signals; the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals.

In one embodiment, the first transmitter 2901 transmits a second information set; herein, the second information set comprises K1 piece(s) of second information, K1 being a positive integer no greater than the K; the K1 piece(s) of second information corresponds (respectively correspond) to K1 first-type reference signal(s) in the K first-type reference signals. L1 piece(s) of second information in the K1 piece(s) of second information comprises (respectively comprise) L1 piece(s) of third sub-information, L2 piece(s) of second information in the K1 piece(s) of second information comprises (respectively comprise) L2 piece(s) of fourth sub-information, L1 and L2 being non-negative integers no greater than the K1. The L1 piece(s) of third sub-information is (are respectively) used for determining L1 MCS threshold set(s), and any of the L1 MCS threshold set(s) comprises a positive integer number of MCS threshold(s); the L1 MCS threshold set(s) is (are respectively) used for determining time-domain density (densities) of L1 first-type reference signal(s), and the L1 first-type reference signal(s) is (are respectively) first-type reference signal(s) in the K first-type reference signals corresponding to the L1 piece(s) of second information; the L2 piece(s) of fourth sub-information is (are respectively) used for determining L2 bandwidth threshold set(s), and any of the L2 bandwidth threshold set(s) comprises a positive integer number of bandwidth threshold(s); the L2 bandwidth threshold set(s) is (are respectively) used for determining frequency-domain density (densities) or sample-density parameter group(s) of L2 first-type reference signal(s), and the L2 first-type reference signal(s) is (are respectively) first-type reference signal(s) in the K first-type reference signals corresponding to the L2 piece(s) of second information.

In one embodiment, the first receiver 1202 also receives third information; herein, the third information is used for determining a first resource-element offset, and a resource-element offset of any of the K first-type reference signals is the first resource-element offset.

In one embodiment, the first transmitter 2901 transmits a fourth information set; herein, the fourth information set comprises K2 piece(s) of fourth information, K2 being a positive integer no greater than the K; the K2 piece(s) of fourth information corresponds (respectively correspond) to K2 first-type reference signal(s) in the K first-type reference signals; the K2 piece(s) of fourth information is (are respectively) used for determining K2 resource-element offset(s), and resource-element offset(s) of the K2 first-type reference signal(s) is (are respectively) the K2 resource-element offset(s).

In one embodiment, the first transmitter 2901 comprises at least one of the antenna 420, the transmitter 418, the transmitting processor 416, the multi-antenna transmitting processor 471, the controller/processor 475, or the memory 476 in Embodiment 4.

In one embodiment, the second processor 2902 comprises at least one of the antenna 420, the receiver 418, the receiving processor 470, the multi-antenna receiving processor 472, the controller/processor 475, or the memory 476 in Embodiment 4, the performing action is receiving.

In one embodiment, the second processor 2902 comprises at least one of the antenna 420, the transmitter 418, the transmitting processor 416, the multi-antenna transmitting processor 471, the controller/processor 475, or the memory 476 in Embodiment 4, the performing action is transmitting.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) for wireless communications, comprising:
   a first receiver, receiving a first signaling; and
   a first processor, operating a first radio signal, the first radio signal comprising K first-type sub-signals and K first-type reference signals, K being a positive integer greater than 1;
   wherein the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; the operating action is transmitting, or the operating action is receiving.

2. The UE according to claim 1, wherein the K first-type reference signals respectively comprise K PTRSs, and the target reference signal port is a DMRS port.

3. The UE according to claim 1, wherein the first radio signal comprises K second-type reference signals; the K second-type reference signals are respectively used for demodulations of the K first-type sub-signals, and a reference signal port (reference signal ports) of any of the K second-type reference signals comprises (comprise) the target reference signal port.

4. The UE according to claim 1, wherein a pattern of a given first-type reference-signal port comprises one or more of a time-domain density, a frequency-domain density, a sample-density parameter group or a resource-element offset of a given first-type reference signal; the given first-type reference-signal port is any of the K first-type reference-signal ports, and the given first-type reference signal is one of the K first-type reference signals transmitted by the given first-type reference-signal port.

5. The UE according to claim 4, wherein the first receiver receives first information; wherein the first information comprises at least one of first sub-information or second sub-information; when the first information comprises the first sub-information, the first sub-information is used for determining a first MCS threshold set, the first MCS threshold set comprising M1 MCS threshold(s), M1 being a positive integer, and the first MCS threshold set is used for determining a time-domain density of any of the K first-type reference signals; when the first information comprises the second sub-information, the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals;

or, the first receiver receives a second information set; wherein the second information set comprises K1 piece(s) of second information, K1 being a positive integer no greater than the K; the K1 piece(s) of second information corresponds (respectively correspond) to K1 first-type reference signal(s) in the K first-type reference signals; L1 piece(s) of second information in the K1 piece(s) of second information comprises (respectively comprise) L1 piece(s) of third sub-information, L2 piece(s) of second information in the K1 piece(s) of second information comprises (respectively comprise) L2 piece(s) of fourth sub-information, L1 and L2 being non-negative integers no greater than the K1; the L1 piece(s) of third sub-information is (are respectively) used for determining L1 MCS threshold set(s), any of the L1 MCS threshold set(s) comprises a positive integer number of MCS threshold(s), the L1 MCS threshold set(s) is (are respectively) used for determining time-domain density (densities) of L1 first-type reference signal(s), and the L1 first-type reference signal(s) is (are respectively) first-type reference signal(s) in the K first-type reference signals corresponding to the L1 piece(s) of second information; the L2 piece(s) of fourth sub-information is (are respectively) used for determining L2 bandwidth threshold set(s), any of the L2 bandwidth threshold set(s) comprises a positive integer number of bandwidth threshold(s), the L2 bandwidth threshold set(s) is (are respectively) used for determining frequency-domain density (densities) or sample-density parameter group(s) of L2 first-type reference signal(s), and the L2 first-type reference signal(s) is (are respectively) first-type reference signal(s) in the K first-type reference signals corresponding to the L2 piece(s) of second information;

or the first receiver receives third information; wherein the third information is used for determining a first resource-element offset, and a resource-element offset of any of the K first-type reference signals is the first resource-element offset;

or, the first receiver receives a fourth information set; wherein the fourth information set comprises K2 piece(s) of fourth information, K2 being a positive integer no greater than the K; the K2 piece(s) of fourth information corresponds (respectively correspond) to K2 first-type reference signal(s) in the K first-type reference signals; the K2 piece(s) of fourth information is (are respectively) used for determining K2 resource-element offset(s), and resource-element offset(s) of the K2 first-type reference signal(s) is (are respectively) the K2 resource-element offset(s).

6. A base station for wireless communications, comprising:
   a first transmitter, transmitting a first signaling; and
   a second processor, performing a first radio signal, the first radio signal comprising K first-type sub-signals and K first-type reference signals, K being a positive integer greater than 1;
   wherein the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; the performing action is receiving, or, the performing action is transmitting.

7. The base station according to claim 6, wherein the K first-type reference signals respectively comprise K PTRSs, and the target reference signal port is a DMRS port.

8. The base station according to claim 6, wherein the first radio signal comprises K second-type reference signals; the K second-type reference signals are respectively used for demodulations of the K first-type sub-signals, and a reference signal port (reference signal ports) of any of the K second-type reference signals comprises (comprise) the target reference signal port.

9. The base station according to claim 6, wherein a pattern of a given first-type reference-signal port comprises one or more of a time-domain density, a frequency-domain density, a sample-density parameter group or a resource-element offset of a given first-type reference signal; the given first-type reference-signal port is any of the K first-type reference-signal ports, and the given first-type reference signal is one of the K first-type reference signals transmitted by the given first-type reference-signal port.

10. The base station according to claim 9, wherein the first transmitter transmits first information; wherein the first information comprises at least one of first sub-information or second sub-information; when the first information comprises the first sub-information, the first sub-information is used for determining a first MCS threshold set, the first MCS threshold set comprising M1 MCS threshold(s), M1 being a positive integer, and the first MCS threshold set is used for determining a time-domain density of any of the K first-type reference signals; when the first information comprises the second sub-information, the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals;

or, the first transmitter transmits a second information set; wherein the second information set comprises K1 piece(s) of second information, K1 being a positive integer no greater than the K; the K1 piece(s) of second information corresponds (respectively correspond) to K1 first-type reference signal(s) in the K first-type reference signals; L1 piece(s) of second information in the K1 piece(s) of second information comprises (respectively comprise) L1 piece(s) of third sub-information, L2 piece(s) of second information in the K1 piece(s) of second information comprises (respectively comprise) L2 piece(s) of fourth sub-information, L1 and L2 being non-negative integers no greater than the K1; the L1 piece(s) of third sub-information is (are respectively) used for determining L1 MCS threshold set(s), any of the L1 MCS threshold set(s) comprises a positive integer number of MCS threshold(s), the L1 MCS threshold set(s) is (are respectively) used for determining time-domain density (densities) of L1 first-type reference signal(s), and the L1 first-type reference signal(s) is (are respectively) first-type reference signal(s) in the K first-type reference signals corresponding to the L1 piece(s) of second information; the L2 piece(s) of fourth sub-information is (are respectively) used for determining L2 bandwidth threshold set(s), any of the L2 bandwidth threshold set(s) comprises a positive integer number of bandwidth threshold(s), the L2 bandwidth threshold set(s) is (are respectively) used for determining frequency-domain density (densities) or sample-density parameter group(s) of L2 first-type reference signal(s), and the L2 first-type reference signal(s) is (are respectively) first-type reference signal(s) in the K first-type reference signals corresponding to the L2 piece(s) of second information;

or, the first transmitter transmits third information; wherein the third information is used for determining a first resource-element offset, and a resource-element offset of any of the K first-type reference signals is the first resource-element offset;

or, the first transmitter transmits a fourth information set; wherein the fourth information set comprises K2 piece(s) of fourth information, K2 being a positive integer no greater than the K; the K2 piece(s) of fourth information corresponds (respectively correspond) to K2 first-type reference signal(s) in the K first-type reference signals; the K2 piece(s) of fourth information is (are respectively) used for determining K2 resource-element offset(s), and resource-element offset(s) of the K2 first-type reference signal(s) is (are respectively) the K2 resource-element offset(s).

11. A method in a UE for wireless communications, comprising:
receiving a first signaling; and
operating a first radio signal, the first radio signal comprising K first-type sub-signals and K first-type reference signals, K being a positive integer greater than 1;
wherein the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; the operating action is transmitting, or the operating action is receiving.

12. The method according to claim 11, wherein the K first-type reference signals respectively comprise K PTRSs, and the target reference signal port is a DMRS port.

13. The method according to claim 11, wherein the first radio signal comprises K second-type reference signals; the K second-type reference signals are respectively used for demodulations of the K first-type sub-signals, and a reference signal port (reference signal ports) of any of the K second-type reference signals comprises (comprise) the target reference signal port.

14. The method according to claim 11, wherein a pattern of a given first-type reference-signal port comprises one or more of a time-domain density, a frequency-domain density, a sample-density parameter group or a resource-element offset of a given first-type reference signal; the given first-type reference-signal port is any of the K first-type reference-signal ports, and the given first-type reference signal is one of the K first-type reference signals transmitted by the given first-type reference-signal port.

15. The method according to claim 14, comprising:
receiving first information; wherein the first information comprises at least one of first sub-information or second sub-information; when the first information comprises the first sub-information, the first sub-information is used for determining a first MCS threshold set, the first MCS threshold set comprising M1 MCS threshold(s), M1 being a positive integer, and the first MCS threshold set is used for determining a time-domain density of any of the K first-type reference signals; when the first information comprises the second sub-information, the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals;

or, receiving a second information set; wherein the second information set comprises K1 piece(s) of second information, K1 being a positive integer no greater than the K; the K1 piece(s) of second information corresponds (respectively correspond) to K1 first-type reference signal(s) in the K first-type reference signals; L1 piece(s) of second information in the K1 piece(s) of second information comprises (respectively comprise) L1 piece(s) of third sub-information, L2 piece(s) of second information in the K1 piece(s) of second information comprises (respectively comprise) L2 piece(s) of fourth sub-information, L1 and L2 being non-negative integers no greater than the K1; the L1 piece(s) of third sub-information is (are respectively) used for determining L1 MCS threshold set(s), any of the L1 MCS threshold set(s) comprises a positive integer number of MCS threshold(s), the L1 MCS threshold set(s) is (are respectively) used for determining time-domain density (densities) of L1 first-type reference signal(s), and the L1 first-type reference signal(s) is (are respectively) first-type reference signal(s) in the K first-type reference signals corresponding to the L1 piece(s) of second information; the L2 piece(s) of fourth sub-information is (are respectively) used for determining L2 bandwidth threshold set(s), any of the L2 bandwidth threshold set(s) comprises a positive integer number of bandwidth threshold(s), the L2 bandwidth threshold set(s) is (are respectively) used for determining frequency-domain density (densities) or sample-density parameter group(s) of L2 first-type reference signal(s), and the L2 first-type reference signal(s) is (are respectively) first-type reference signal(s) in the K first-type reference signals corresponding to the L2 piece(s) of second information;

or, receiving third information; wherein the third information is used for determining a first resource-element offset, and a resource-element offset of any of the K first-type reference signals is the first resource-element offset;

or, receiving a fourth information set; wherein the fourth information set comprises K2 piece(s) of fourth information, K2 being a positive integer no greater than the K; the K2 piece(s) of fourth information corresponds (respectively correspond) to K2 first-type reference signal(s) in the K first-type reference signals; the K2 piece(s) of fourth information is (are respectively) used for determining K2 resource-element offset(s), and resource-element offset(s) of the K2 first-type reference signal(s) is (are respectively) the K2 resource-element offset(s).

16. A method in a base station for wireless communications, comprising:
transmitting a first signaling;
performing a first radio signal, the first radio signal comprising K first-type sub-signals and K first-type reference signals, K being a positive integer greater than 1;
wherein the first signaling is used for determining time-frequency resources occupied by the first radio signal; time-domain resources occupied by the K first-type sub-signals are non-orthogonal, and frequency-domain resources occupied by each two of the K first-type sub-signals are mutually orthogonal; the K first-type reference signals are respectively used for channel estimation of the K first-type sub-signals, the K first-type reference signals are respectively transmitted by K first-type reference-signal ports, and each of the K first-type reference-signal ports is associated with a target reference signal port; there exist two of the K first-type reference-signal ports that have different patterns; the performing action is receiving, or, the performing action is transmitting.

17. The method according to claim 16, wherein the K first-type reference signals respectively comprise K PTRSs, and the target reference signal port is a DMRS port.

18. The method according to claim 16, wherein the first radio signal comprises K second-type reference signals; the K second-type reference signals are respectively used for demodulations of the K first-type sub-signals, and a reference signal port (reference signal ports) of any of the K second-type reference signals comprises (comprise) the target reference signal port.

19. The method according to claim 16, wherein a pattern of a given first-type reference-signal port comprises one or more of a time-domain density, a frequency-domain density, a sample-density parameter group or a resource-element offset of a given first-type reference signal; the given first-type reference-signal port is any of the K first-type reference-signal ports, and the given first-type reference signal is one of the K first-type reference signals transmitted by the given first-type reference-signal port.

20. The method according to claim 19, comprising:
transmitting first information; wherein the first information comprises at least one of first sub-information or second sub-information; when the first information comprises the first sub-information, the first sub-information is used for determining a first MCS threshold set, the first MCS threshold set comprising M1 MCS threshold(s), M1 being a positive integer, and the first MCS threshold set is used for determining a time-domain density of any of the K first-type reference signals; when the first information comprises the second sub-information, the second sub-information is used for determining a first bandwidth threshold set, the first bandwidth threshold set comprising M2 bandwidth threshold(s), M2 being a positive integer, and the first bandwidth threshold set is used for determining a frequency-domain density or a sample-density parameter group of any of the K first-type reference signals;

or, transmitting a second information set; wherein the second information set comprises K1 piece(s) of second information, K1 being a positive integer no greater than the K; the K1 piece(s) of second information corresponds (respectively correspond) to K1 first-type reference signal(s) in the K first-type reference signals; L1 piece(s) of second information in the K1 piece(s) of second information comprises (respectively comprise) L1 piece(s) of third sub-information, L2 piece(s) of second information in the K1 piece(s) of second infor- mation comprises (respectively comprise) L2 piece(s)

of fourth sub-information, L1 and L2 being non-negative integers no greater than the K1; the L1 piece(s) of third sub-information is (are respectively) used for determining L1 MCS threshold set(s), any of the L1 MCS threshold set(s) comprises a positive integer number of MCS threshold(s), the L1 MCS threshold set(s) is (are respectively) used for determining time-domain density (densities) of L1 first-type reference signal(s), and the L1 first-type reference signal(s) is (are respectively) first-type reference signal(s) in the K first-type reference signals corresponding to the L1 piece(s) of second information; the L2 piece(s) of fourth sub-information is (are respectively) used for determining L2 bandwidth threshold set(s), any of the L2 bandwidth threshold set(s) comprises a positive integer number of bandwidth threshold(s), the L2 bandwidth threshold set(s) is (are respectively) used for determining frequency-domain density (densities) or sample-density parameter group(s) of L2 first-type reference signal(s), and the L2 first-type reference signal(s) is (are respectively) first-type reference signal(s) in the K first-type reference signals corresponding to the L2 piece(s) of second information;

or, transmitting third information; wherein the third information is used for determining a first resource-element offset, and a resource-element offset of any of the K first-type reference signals is the first resource-element offset;

or, transmitting a fourth information set; wherein the fourth information set comprises K2 piece(s) of fourth information, K2 being a positive integer no greater than the K; the K2 piece(s) of fourth information corresponds (respectively correspond) to K2 first-type reference signal(s) in the K first-type reference signals; the K2 piece(s) of fourth information is (are respectively) used for determining K2 resource-element offset(s), and resource-element offset(s) of the K2 first-type reference signal(s) is (are respectively) the K2 resource-element offset(s).

\* \* \* \* \*